(12) United States Patent
Hull et al.

(10) Patent No.: US 8,590,516 B2
(45) Date of Patent: Nov. 26, 2013

(54) INTERNAL COMBUSTION ENGINE

(76) Inventors: Robert Hull, Purdy, MO (US); Nathan Rogers, Phoenix, AZ (US)

(*) Notice: Subject to any disclaimer, the term of this patent is extended or adjusted under 35 U.S.C. 154(b) by 0 days.

(21) Appl. No.: 12/588,094

(22) Filed: Oct. 2, 2009

(65) Prior Publication Data

US 2010/0258094 A1    Oct. 14, 2010

(51) Int. Cl.
F02B 75/18    (2006.01)
(52) U.S. Cl.
USPC ....... 123/536; 123/3; 123/196 AB; 123/41.01
(58) Field of Classification Search
USPC .................. 123/536–639, 3, 196 R, 41.01
See application file for complete search history.

(56) References Cited

U.S. PATENT DOCUMENTS

| | | |
|---|---|---|
| 609,250 A | 8/1898 | Tesla |
| 2,717,305 A * | 9/1955 | Guthrie ........................ 219/205 |
| 4,196,886 A | 4/1980 | Murray |
| 4,332,223 A | 6/1982 | Dalton |
| 4,450,075 A | 5/1984 | Krow |
| 4,460,516 A | 7/1984 | Kapitanov et al. |
| 4,497,298 A | 2/1985 | Ament |
| 4,522,166 A * | 6/1985 | Toivio et al. .............. 123/196 A |
| 4,539,503 A | 9/1985 | Esper et al. |
| 4,595,975 A | 6/1986 | Gray, Sr. |
| 4,673,240 A | 6/1987 | Byfield, Jr. |
| 4,716,024 A | 12/1987 | Pera |
| 4,730,591 A * | 3/1988 | Gohara et al. ................ 123/510 |
| 4,784,178 A | 11/1988 | Kasaya et al. |
| 4,844,029 A * | 7/1989 | Suzuki .................... 123/142.5 E |
| 4,875,658 A | 10/1989 | Asai |
| 4,893,597 A * | 1/1990 | Kandler ................. 123/195 HC |
| 5,055,006 A | 10/1991 | Kobayashi et al. |
| 5,122,020 A | 6/1992 | Bedi |
| 5,163,401 A * | 11/1992 | Reese ........................... 123/376 |
| 5,167,782 A | 12/1992 | Marlow |
| 5,275,892 A | 1/1994 | Hyner et al. |
| 5,314,625 A | 5/1994 | Farnelli |
| 5,363,814 A | 11/1994 | Daikoku |
| 5,484,244 A | 1/1996 | Glovan et al. |
| 5,641,256 A | 6/1997 | Gundy |
| 5,724,943 A | 3/1998 | Blount et al. |
| 5,727,776 A | 3/1998 | Gerstenberger |
| 5,752,157 A | 5/1998 | Yamashita et al. |
| 5,794,601 A | 8/1998 | Pantone |
| 5,942,731 A | 8/1999 | Rogerson |
| 6,007,715 A | 12/1999 | Liu et al. |
| 6,178,953 B1 | 1/2001 | Cox |
| 6,289,868 B1 | 9/2001 | Jayne |

(Continued)

FOREIGN PATENT DOCUMENTS

| | | |
|---|---|---|
| EP | 1 770 715 A1 | 4/2007 |
| EP | 1 770 717 A1 | 4/2007 |

OTHER PUBLICATIONS

Global Environmental Energy Technology, Single Auto Conversion Plans, p. 1 and 3-17, 1998.

(Continued)

*Primary Examiner* — M. McMahon
(74) *Attorney, Agent, or Firm* — Richards Patent Law P.C.

(57) ABSTRACT

Apparatuses and methods related to an internal combustion engine are disclosed herein. In some embodiments, the apparatuses and methods include modifying a conventional internal combustion engine to enhance an operating efficiency. In other embodiments, an internal combustion engine of enhanced operating efficiency is disclosed.

13 Claims, 6 Drawing Sheets

(56) References Cited

U.S. PATENT DOCUMENTS

| | | | |
|---|---|---|---|
| 6,355,166 | B1 | 3/2002 | Amarasinghe et al. |
| 6,456,178 | B1 | 9/2002 | Chiu |
| 6,748,933 | B2 | 6/2004 | Prévost |
| 6,851,413 | B1 | 2/2005 | Tamol, Sr. |
| 6,883,490 | B2 | 4/2005 | Jayne |
| 6,883,507 | B2 | 4/2005 | Freen |
| 7,255,290 | B2 | 8/2007 | Bright et al. |
| 7,263,981 | B2 | 9/2007 | Woody |
| 7,438,059 | B2 | 10/2008 | Mills et al. |
| 7,469,688 | B2 | 12/2008 | Jonson et al. |
| 7,510,632 | B2 | 3/2009 | Denes et al. |
| 2002/0152674 | A1 | 10/2002 | Prevost |
| 2003/0101973 | A1 | 6/2003 | Z. |
| 2003/0140903 | A1 | 7/2003 | Smoot |
| 2004/0050618 | A1 | 3/2004 | Marocco |
| 2004/0237948 | A1 | 12/2004 | Magyari |
| 2004/0261746 | A1* | 12/2004 | Narasimhan et al. ...... 123/188.3 |
| 2005/0016507 | A1 | 1/2005 | Tamol, Sr. |
| 2006/0037567 | A1* | 2/2006 | Thomas ................ 123/56.7 |
| 2006/0191190 | A1 | 8/2006 | Wang |
| 2006/0196481 | A1 | 9/2006 | Mills et al. |
| 2006/0196483 | A1* | 9/2006 | Magyari ................ 123/538 |
| 2006/0260587 | A1 | 11/2006 | Woody |
| 2007/0241033 | A1 | 10/2007 | Stephenson |
| 2007/0243070 | A1 | 10/2007 | Matheny |
| 2007/0272218 | A1 | 11/2007 | Woody |
| 2008/0050306 | A1 | 2/2008 | Keller et al. |
| 2008/0110428 | A1 | 5/2008 | Guo |
| 2008/0271723 | A1 | 11/2008 | Cowden |
| 2008/0276911 | A1 | 11/2008 | Woody |
| 2009/0038591 | A1 | 2/2009 | Lee et al. |
| 2009/0114168 | A1* | 5/2009 | Lee et al. ................ 123/3 |
| 2009/0140623 | A1 | 6/2009 | Ugalde |
| 2009/0151337 | A1* | 6/2009 | Tornambe ................ 60/295 |
| 2009/0180939 | A1 | 7/2009 | Hagen et al. |
| 2010/0175655 | A1 | 7/2010 | Lykowski et al. |

OTHER PUBLICATIONS

Edelbrock Performer Series® Carburetor Owner's Manual, 3 pages, Aug. 1994.

Eastwood Manufacturing, Materials, 2 pages, 2003.

Adachi, "The Joe Energy Cell," *Educate-Yourself*, Aug. 5, 2000.

Bromberg et al., "Hydrogen Manufacturing Using Low Current, Non-Thermal Plasma Boosted Fuel Conversters," *Proceedings of the Symposium on Energy for the 21$^{st}$ Century: Hydrogen Energy*, Dec. 11, 2000, 5 pages.

"Arvin Meritor/MIT Plasma Fuel Reformer," *Green Car Congress*, 2 pages, Jun. 11, 2004.

"Magnetic Fuel Saver, other Fuel Savers and Fuel Optimizers," 6 pages, Jun. 19, 2006.

Baraka, "The Secret of the J-Cell," *Which of the graceful gifts of God would you refuse?*, p. 1-22, Sep. 9, 2006.

Power Oil Filter Magnet (POWERMAG), *Dailymag*, 5 pages, 2005.

Sensing, "Gas-Plasma Autos on the Way?," WindsofChange.net, p. 1-4, May 27, 2008.

"How the 'Plasma Transition Process' motor system works," PureEnergySystems.com, 7 pages, PESN, Jul. 18, 2009.

"Keshe launching energy generation and space exploration plasma technolgy," PureEnergySystems.com, 6 pages, PESN, Jul. 22, 2009.

"Plasma Energy and Anti-Gravity Applications," peswiki.com, 15 pages, Jul. 19, 2009.

Barry, "Your Engine Can Do the Dew Too!," wired.com, p. 1-7, Aug. 6, 2009.

H2OIL Corporation, 2009, 1 page.

Brainerd, "PetroBeam Aims to Unlock Value at the Bottom of the Oil Barrel," *Tech Notes*, May 2009, vol. 235, No. 5, 2 pages.

Halfrid, 6 pages.

Pristec, Technology Environment, 2009, 1 page.

* cited by examiner

INTERNAL COMBUSTION ENGINE

FIELD OF THE INVENTION

Embodiments of this invention relate generally to internal combustion engines and, more particularly, to mechanisms and methods for improving the overall performance and efficiency of such engines.

BACKGROUND OF THE INVENTION

An internal combustion engine (ICE) converts energy into work. Indeed, these engines are used to power many of the devices we benefit from every day, including, but not limited to, automobiles, airplanes, and electric generators. In other words, the internal combustion engine quite literally drives the world's economy.

As used herein, the terms "engine" or "internal combustion engine" include, for example, without limitation, any device that converts energy, released by the combustion of a fuel, into mechanical energy in an output shaft or the like of the engine, regardless of size, application, or type of fuel. As also used herein, the terms "fuel" or "hydrocarbon fuel" include, for example, without limitation, any substance or material, organic or inorganic, which may be burned to release energy. Such substances or materials include, but are not limited to, crude oil, gasoline, diesel, kerosene, bio-diesel, heavy oil, or other fuel oil or any mixture thereof in any form. Although many of these fuels are considered to be nonrenewable natural resources, the principles of the present disclosure may be utilized with internal combustion engines running on fuels derived from renewable resources.

In today's society, it has become increasingly important to conserve energy and, in particular, hydrocarbon fuels. Societal and governmental pressure is causing many automobile and other manufacturers to rethink and redefine the definition of fuel economy. Even with improvements in fuel economy, however, many of the automobiles being manufactured and in use today continue to be powered by internal combustion engines. In addition, the average individual is driving more frequently and longer distances, which in itself tends to offset the gains achieved by improved fuel economies. Thus, because of the enormous amount of fuel converted into energy by internal combustion engines, even a small improvement in fuel efficiency can be a significant step towards energy conservation goals.

Improved fuel efficiency can also provide substantial environmental benefits. Since less fuel is being converted into energy, a proportionately smaller amount of harmful emissions is being produced. Again, because of the sheer number of internal combustion engines in use, this can create a significant overall improvement. Additional benefits may be obtained if the process of converting fuel into energy itself may be improved to produce cleaner exhaust.

Of course, the use of the internal combustion engine is not restricted to the automotive field. Diesel engines, for example, power many of the world's trains, and turbine engines power a majority of the world's commercial airplanes and electric power generating stations. In many cases, internal combustion engines are also used to power agricultural and construction equipment.

Accordingly, there exists a need for an apparatus and methodology for improving the overall performance and efficiency of internal combustion engines.

SUMMARY OF THE INVENTION

Embodiments of the present disclosure provide apparatuses and methods related to internal combustion engines.

An aspect of the present disclosure includes a method of operating an internal combustion engine. The method may include delivering an energy from an electrical energy source to a first portion of the internal combustion engine and combining a fuel with an oxidation medium to create a combustion mixture, wherein the combustion mixture may include a plasma. The method may further include combusting the combustion mixture.

Various embodiments of the disclosure may include one or more of the following aspects: the oxidation medium may include air; the plasma may include a cold plasma; the step of magnetizing a second portion of the internal combustion engine; the step of regulating the delivery of the energy to the first portion of the internal combustion engine; the step of ionizing the fuel; the fuel may include ionized fuel; the electrical energy source may include at least one of an alternator and a battery; an energy delivery device may connect the electrical energy source and the first portion of the internal combustion engine; the first portion of the engine may include a fluid within the internal combustion engine; the step of delivering an energy from an electrical energy source to the first portion of the internal combustion engine may include delivering the energy directly to oil within the internal combustion engine; the energy delivery device may include an electrically conductive elongate member having a first end and a second end; the first end is connected to an output of the electrical energy source and the second end is in direct contact with the fluid within the internal combustion engine; the step of utilizing a central processing unit to automatically control a variable parameter of the internal combustion engine; and at least the step of delivering an energy from an electrical energy source to a first portion of the internal combustion engine may be controlled by a component having a central processing unit.

Another aspect of the present disclosure includes a method of altering a combustion characteristic of a fuel. The method includes ionizing the fuel and changing a phase of the fuel.

Various embodiments of the disclosure may include one or more of the following aspects: the step of changing a phase of the fuel may include changing fuel vapors to a plasma; the step of changing fuel vapors to a plasma may include combining the fuel vapors with an oxidation medium; the plasma may include a cold plasma; the oxidation medium may include air; the step of ionizing the fuel may include exposing the fuel to a magnetic field; the step of ionizing the fuel may include exposing the fuel to engine components including one of nickel and silver; and the step of ionizing the fuel may include conditioning the fuel to absorb an energy.

A further aspect of the disclosure includes an engine system. The engine system may include a fuel system having a fuel source for containing a fuel and a fuel delivery apparatus. The engine system may also include an internal combustion engine having an engine block, wherein a portion of the engine block is configured to include a fluid therein; an energy source; and an apparatus for delivering energy from the energy source to the portion of the engine block configured to include the fluid.

Various embodiments of the disclosure may include one or more of the following aspects: the internal combustion engine may include at least one fastener having a portion made of one of nickel and silver; the fuel source may include a fuel tank; the fuel tank may be elevated relative to the internal combustion engine so that the fuel may be gravity fed from the fuel tank to the internal combustion engine; the fuel delivery apparatus may include a fuel delivery conduit and a valve; the valve may include a needle valve; the needle valve may include a needle having an insert, and wherein the needle is made of a first material and the insert is made of a second material different from the first material; one of the first and second materials may include one of nickel and silver; the fluid may include engine oil; the energy source may include at least one of an alternator and a battery; the apparatus for delivering energy from the energy source to the portion of the engine block configured to include the fluid may include a device for electrically connecting the energy source and the portion of the engine block configured to include the fluid; the apparatus may also include a component for regulating the flow of energy through the apparatus; the component may include a plurality of diodes; the apparatus for delivering energy from the energy source to the portion of the engine block configured to include the fluid may include an electrically conductive elongate member having a first end and a second end; the first end may be directly connected to an output of the energy source, and the second end may be connected to the portion of the engine block configured to include the fluid, so that the second end is exposed to the fluid, and wherein the second end may be electrically isolated from the engine block; the component may include a central processing unit for automatically regulating the flow of energy through the apparatus; a central processing unit; and the central processing unit may control the internal combustion engine.

Another aspect of the present disclosure may include a method for operating an internal combustion engine having engine oil circulating therein. The method may include the step of delivering an energy from an electrical energy source directly to the engine oil.

Various embodiments of the disclosure may include one or more of the following aspects: the step of regulating the delivery of the energy to the engine oil; the electrical energy source may include an alternator; the step of delivering an energy from an electrical energy source directly to the engine oil may include delivering the energy via an energy delivery device having a first end and a second end, and wherein the first end is connected to the electrical energy source and the second end is in a direct contacting relationship with the engine oil; the energy delivery device may include an apparatus for regulating the flow of energy through the energy delivery device; and the apparatus may include a central processing unit for automatically regulating the flow of energy through the energy delivery device.

A further aspect of the present disclosure may include a method of operating an internal combustion engine. The method may include delivering an energy from an electrical energy source to a fluid within the internal combustion engine; regulating the delivery of the energy to the fluid within the internal combustion engine; magnetizing a portion of the internal combustion engine; conditioning a fuel for delivery to the internal combustion engine; combining the fuel with air to create a combustion mixture; and combusting the combustion mixture.

Various embodiments of the disclosure may include one or more of the following aspects: the electrical energy source may include at least one of an alternator and a battery; the fluid may include one of a lubricating agent or a heat transfer agent; the step of conditioning the fuel may include ionizing the fuel; the step of conditioning the fuel may include exposing the fuel to a magnetic field; the step of conditioning the fuel may include exposing the fuel to engine components including one of nickel and silver; the step of combining the fuel with air to create a combustion mixture may include combining fuel vapors with air; the combustion mixture may include a plasma; the plasma may include a cold plasma; the fluid may include an oil; the step of delivering an energy from an electrical energy source to a fluid within the internal combustion engine may include delivering the energy via an energy delivery device; the energy delivery device may include an elongate member having a first end and a second end, wherein the first end may be connected to the electrical energy source and the second end may be exposed to the fluid within the internal combustion engine; the second end may be insulated from a housing of the engine; the step of removing particulates from an exhaust of the internal combustion engine; the step of regulating the delivery of the energy to the fluid may include regulating the delivery with a central processing unit; and the step of controlling a parameter of the internal combustion engine with a central processing unit.

An even further aspect of the present disclosure may include a method of operating an internal combustion engine. The method may include delivering an energy from an alternator to engine oil within the internal combustion engine; regulating the delivery of the energy to the engine oil; magnetizing a portion of the internal combustion engine; delivering ionized fuel to the internal combustion engine; regulating the flow of ionized fuel to the internal combustion engine with a valve, wherein a portion of the valve is made of one of nickel and silver; combining the ionized fuel with air to create a combustion mixture, wherein the combustion mixture may include a cold plasma; and combusting the combustion mixture.

Various embodiments of the disclosure may include one or more of the following aspects: an energy delivery device electrically may connect the alternator to the engine oil; the energy delivery device may include an electrically conductive elongate member having a first end and a second end; the first end may be electrically connected to a positive pole of the alternator, and the second end may be electrically connected to an electrically conductive probe; the probe may be in a contacting relationship with the engine oil; the probe may be electrically isolated from an engine housing of the internal combustion engine; the energy delivery device may also include a component for regulating the flow of energy through the energy delivery device; the component may include a plurality of electrical components; the plurality of electrical components may include diodes; the ionized fuel may include liquid ionized fuel and vapor ionized fuel; the step of combining the ionized fuel with air to create a combustion mixture may include combining vapor ionized fuel with air; the step of filtering an exhaust of the internal combustion engine to remove hydrocarbon particulates from the exhaust; the step of reintroducing the removed particulates into the internal combustion engine; the step of combusting the combustion mixture may include selectively altering an amount of current delivered to an ignition mechanism of the internal combustion engine; the step of including one or more fasteners within the internal combustion engine, the one or more fasteners having portions made of one of nickel and silver; the component may include a central processing unit; and the step of controlling a parameter of the internal combustion engine with a central processing unit.

Another aspect of the present disclosure may include an engine system. The engine system may include an engine having a portion containing engine oil therein; an electrical energy source; and an apparatus for delivering energy from the electrical energy source to the engine oil. The apparatus may include a conductive elongate member having a first end and a second end. The first end may be connected to the electrical energy source and the second end may be exposed to the engine oil.

Various embodiments of the disclosure may include one or more of the following aspects: a fuel source containing a fuel;

a fuel delivery apparatus, wherein the fuel delivery apparatus may include a fuel conduit and a valve for controlling the flow of fuel through the fuel conduit; the valve may include a needle valve having a portion made of one of nickel and silver; the apparatus may include a device for regulating the flow of energy through the apparatus; the device may include a plurality of electrical components; the plurality of electrical components may include diodes; the engine may include a housing and the second end may be insulated from the housing; the device may include a central processing unit; and a central processing unit for controlling a parameter of the engine.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

To facilitate an understanding of the principles of the present disclosure, the following discussion of a conventional automobile internal combustion engine and a selection of its various components is provided. Although automobile engines are discussed in detail below, the various embodiments disclosed herein are not limited to these exemplary uses. As a non-limiting example, the principles of the present disclosure may be also utilized in, among other things, the engine of a watercraft, a jet engine of an aircraft, an engine of a lawn mower or other agricultural equipment, and in fuel-powered generators, just to name a few.

Figure 1:
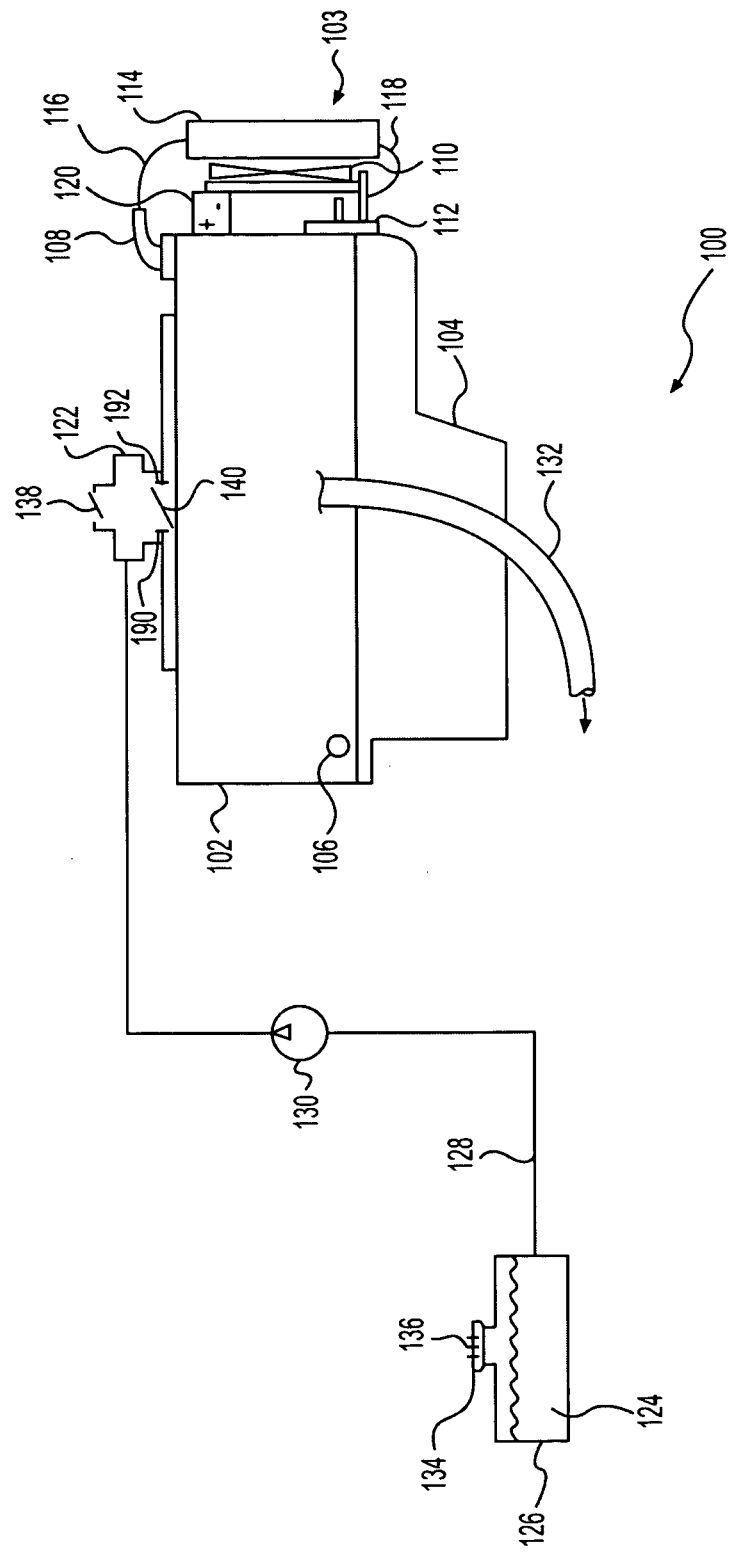
FIG. 1 is a schematic drawing of an exemplary conventional automobile internal combustion engine.

Referring to FIG. 1, there is depicted an automobile internal combustion engine 100. Although it is recognized that automobile engines, and internal combustion engines in general, may vary greatly in design, engine 100 depicted in FIG. 1 is utilized for discussion purposes only. Engine 100 includes, among other things, an engine block 102, which houses a number of cylinders (not shown) and corresponding pistons (not shown). Although many of today's engines include four, six, or eight cylinders (and pistons), the principles of the present disclosure may be utilized with engines having any number of cylinders and corresponding pistons.

With continued reference to FIG. 1, engine 100 further includes an oil pan 104 extending from engine block 102. Oil pan 104 typically includes a removable chamber or bowl that is secured to a lower portion of engine block 102. As one having ordinary skill in the art will recognize, oil pan 104 functions to collect and store the oil used to lubricate the moving parts of engine 100. In addition to lubricating the moving parts of engine 100, the oil within engine block 102 facilitates the removal of heat from within engine block 102. Engine 100 may also include an oil filter (not shown), which generally functions to remove particulates and debris from the circulating oil, and an oil pressure sensor 106, which functions to measure the pressure of the circulating oil.

Engine 100 may also include a thermostat 108, a fan 110, a water pump 112, and a radiator 114. Together, these components function as a cooling system 103 for engine 100 so as to regulate the temperature of engine 100. Specifically, water pump 112 functions to circulate a cooling fluid between engine block 102 and radiator 114. The cooling fluid may include water, a mixture of water and ethylene glycol ($C_2H_6O_2$), which is also known as antifreeze, or any other suitable cooling fluid known in the art. Radiator 114 functions as a heat exchanger and transfers heat from the cooling fluid flowing from engine block 102 to the air blowing through radiator 114 by fan 110. Thermostat 108 functions to regulate the rate of cooling fluid flowing from engine block 102 to radiator 114. The cooling fluid is circulated between engine block 102 and radiator 114 by an upper hose 116 and a lower hose 118.

Engine 100 further includes an alternator 120. Alternator 120 may include any conventional alternator, such as, for example, three-phase alternators. As those having ordinary skill in the art will recognize, alternator 120 converts mechanical energy produced by engine 100 into electrical energy, which may be used to power an automobile's various electrical components, such as, for example, the headlights or radio, and/or recharge a portable power source, such as, for example, a battery. Like many power generation devices, alternator 120 includes both positive and negative poles. As illustrated in FIG. 1, the positive pole is indicated by a "+" symbol and the negative pole is indicated by a "−" symbol.

Engine 100 also includes a carburetor 122. As readily recognized in the art, carburetor 122 includes a device that combines air and fuel to produce an air/fuel combustion mixture for engine 100. Although the principles of the present disclosure will be largely discussed in connection with engines utilizing carburetors, those of ordinary skill of art will readily recognize that the embodiments described herein may be utilized with any internal combustion engine, regardless of the fuel delivery mechanism utilized. Indeed, the principles of the present disclosure may be utilized with automobile engines utilizing fuel injection technology, as will be discussed in greater detail below and in connection with FIG. 3.

Carburetor 122 may be secured to engine block 102 by a plurality of suitable fasteners 190, 192 known in the art. Fasteners 190, 192 may include, but are not limited to, bolts and/or screws. Although the illustrated embodiments depict the use of two fasteners 190, 192 to secure carburetor 122 to engine block 102, those of ordinary skill in the art will readily recognize that a greater or lesser number of fasteners may be used. Carburetor 122 may include a throttle plate 138, which serves to regulate the flow of air into carburetor 122. In a conventional automobile internal combustion engine, the air flowing into a carburetor, such as, for example, carburetor 122, is approximately 600 cubic feet per minute (cfm). The air flowing into carburetor 122 mixes with fuel supplied to carburetor 122 to create an air/fuel combustion mixture, which is then supplied to engine block 102 for combustion purposes. The air/fuel combustion mixture is ignited with a cylinder by a spark provided by a spark plug (not shown). Carburetor 122 may also include a lower plate 140, which serves to regulate the flow of the air/fuel mixture into engine block 102. As will be appreciated by those of ordinary skill in the art, both throttle plate 138 and lower plate 140 may be selectively adjusted to increase the flow of air and air/fuel combustion mixture, respectively.

With continuing reference to FIG. 1, carburetor 122 receives fuel 124 from fuel tank 126 via fuel line 128. Fuel line 128 may be any suitable fuel line known in the art. Generally, fuel tank 126 may be spaced from engine block 102 and a mechanism for transporting fuel 124 from fuel tank 126 to carburetor 122 may be required. In these instances, fuel pump 130 transports fuel 124 from fuel tank 126 to carburetor 122 by increasing the pressure of fuel 124, as readily known in the art. As already alluded to above, fuel 124 may include, for example, any substance or material, organic or inorganic, renewable or non-renewable, which may be burned in a combustion process to release energy. In some embodiments, fuel tank 126 may include a tank cap 134. Tank cap 134 may be removably secured to fuel tank 126 and may be removed to replenish the fuel 124 within fuel tank 126 as necessary. Tank cap 134 may include a plurality of openings or vents 136. Vents 136 may be configured to permit fuel vapors and/or atmospheric air to traverse tank cap 134.

Once fuel 124 reaches carburetor 122, it is mixed with a predetermined amount of air and delivered to engine block 102 to form an air/fuel combustion mixture. This combustion mixture is then supplied to engine block 102, which typically maintains a vacuum of approximately 18 Hg, for combustion purposes. Once the combustion process is complete, combustion exhaust gases are evacuated from within engine block 102 by an exhaust 132.

In a conventional automobile internal combustion engine, such as, for example, engine 100, the temperature of the exhaust gases leaving engine block 102 is typically in the range of 400° F.-1400° F. These exhaust gases can be highly toxic and typically contain carbon monoxide, unburned fuel, unburned carbon, soot, and oil vapor. These toxic compounds are commonly a result of incomplete combustion, which may be caused by a fuel quality being incompatible with the required combustion process, incomplete mixing of the fuel and air, or insufficient heat to provide fuel decomposition, etc. Most fuels contain a wide variety of dissimilar hydrocarbon compounds with corresponding variable rates of vaporization, decomposition, and combustion reaction intensities. Some fuels vaporize quickly, decomposing easily and burning smoothly, while others vaporize very slowly, decomposing incompletely to form unstable compounds that burn very fast and even detonate. Still others simply polymerize into clusters, absorb heat energy, and simply escape out the exhaust as pollution.

Ideally then, for an internal combustion engine, or combustion equipment, to function at its optimum potential with minimum toxic emissions and the greatest possible efficiency with lower maintenance, vibration, and operating temperatures, the fuel must be able to vaporize and decompose easily and to propagate combustion reactions with controlled, stable velocities with an absolute minimum of shock waves.

Fuels, such as aviation fuel, gasoline, diesel fuel, propane, and natural gas are all made up of the same building blocks, hydrogen and carbon. The difference between natural gas and diesel, for example, is simply how many carbon and hydrogen atoms are attached to each other in each molecule of fuel. The molecules of natural gas, for example, are very small and light since they contain only one carbon and four hydrogen atoms. This means that each molecular cluster of natural gas contains only one atom of carbon and only four atoms of hydrogen. It is so light that it is a gas at room temperature. When it burns, it essentially decomposes into carbon and hydrogen, which in turn bond to oxygen separately to form carbon dioxide gas, $CO_2$, and water vapor, $H_2O$. Every molecule of fuel produces one carbon dioxide molecule and two water molecules during combustion, which are the ultimate exhaust products of clean-burning natural gas.

In contrast, diesel fuel has many more atoms of carbon and hydrogen stuck together, for example, $C_{15}H_{32}$. This means, in this example, that every molecule contains fifteen carbon atoms and thirty-two hydrogen atoms bonded into one molecular cluster. These molecules are so heavy that they form dense liquids at room temperatures. In order to burn (i.e., chemically combine with oxygen to produce heat), each of the fifteen carbon atoms and thirty-two hydrogen atoms must break apart from each other so that the carbon atoms can combine with oxygen to form carbon dioxide, $CO_2$, and the hydrogen atoms can combine with oxygen to form water vapor, $H_2O$. This is exactly the same process as burning natural gas, $CH_4$, but because there are so many more atoms clustered into each molecule, it is a lot more difficult to break all of the atoms apart from each other. When the atoms do not break apart cleanly and easily, they do not all form $CO_2$ and $H_2O$. Instead, a lot of carbon atoms form their own clusters, without oxygen, to form soot, which is usually seen as black smoke coming from the exhaust system on many large diesel engines. In addition, many molecules of partially decomposed fuel leave the exhaust completely unburned, accounting for the acrid smell typically associated with diesel engines.

Natural gas burns clean because it is composed of lighter molecules having only one carbon atom and four hydrogen atoms stuck together, and diesel fuel burns poorly because it is composed of heavier molecules of, for example, fifteen carbon atoms and thirty-two hydrogen atoms stuck together. The burning process itself does not change, disregarding the speed and reaction time of combustion in this example—only the complexity of molecular disintegration into atoms makes it more difficult to completely burn all of the atoms. In order to burn all of the atoms in any given fuel, therefore, the heavier molecules of typical fuels, such as, for example, gasoline, diesel, and kerosene, must be shattered.

Clean-burning, high-performance liquid fuels, such as high-octane aviation fuel, are made of the same components as diesel fuel and natural gas. However, the molecular structures of these fuels are refined in such a way as to have weak molecular bonds, which allows the fuels to decompose easily and quickly. The refining process can be very simple or increasingly complex, depending on the desired molecular bonding structure. To refine fuel, it helps to understand that crude oil contains every type of hydrocarbon cluster imaginable, from very light liquids to heavy oils and even tar all mixed together. Refiners ideally want to separate each group out so that the light liquids can be used for aviation (high-octane properties) and the middle groups, which are heavier, can be used as diesel fuel, etc. Distillation practices help separate some of these fuels into their similar molecular weight categories, but it is relatively slow and not an exact science. The distillation process basically relies on the principle that when heated at low temperatures, the lighter weight molecules, because they are bonded with only a few carbon and hydrogen atoms, become gases and subsequently rise to the top of the distillation tower and are extracted. When the temperature is raised slightly higher, the next heavier group of hydrocarbon clusters rise to the top for extraction and so on. As the hydrocarbon clusters become bigger, however, they do not easily separate or break apart from each other. The bigger the molecule, the stronger the forces of attraction hold them together.

Refiners soon learned that if they ran hydrocarbon fluids through metal catalysts, the electro-chemical reactions between the hydrocarbon clusters and the metal catalysts caused the hydrocarbon molecules to break apart into smaller clusters. This is because the electron orbits that are shared between the clusters of atoms are drawn, or rather, detached from each other, effectively breaking the links holding them together. These links break apart randomly, forming smaller and lighter molecular clusters, each of which may contain any random number of atoms. Such processes are generally referred to as hydrocarbon "cracking" processes.

The combustion of hydrocarbon-based fuels does not have to produce toxic pollution. The chemical reactions involved in the combustion process produces heat energy. Although this heat energy is the desired product of combusting fuel, it is difficult to manipulate and convert into controlled energy. The burning or combustion of hydrocarbon fuels in an internal combustion engine produces a wide spectrum of electromagnetic radiation, of which only a portion can be converted into useable heat, or rather, pressure. The rest is usually wasted because the gaseous molecules in the combustion chamber are unable to absorb some of the intense radiation produced during combustion reactions. Some of the energy that is absorbed effectively accelerates the vibration levels of the gaseous molecules, allowing them to apply greater pressure on their surroundings. In an internal combustion engine, this pressure is converted into mechanical movement or power. Only about one third of the heat energy produced during combustion, however, is converted into useable pressure. The remainder of this energy is not entirely lost, but unfortunately can be responsible for the production of nitrous oxide ($NO_{-x}$) emissions, excessive vibration, excessive heat in other parts of the combustion apparatus, and even excessive noise. As well, spontaneous, incomplete combustion reactions produce other types of unwanted, toxic emissions, such as carbon monoxide and soot.

$NO_{-x}$ emissions can also be a result of a fuel's poor combustion characteristics, assuming properly functioning equipment and correct air/fuel ratios for complete combustion. When the fuel does not vaporize and decompose easily, the reaction time, once combustion is initiated, is delayed with a corresponding increase in combustion intensity. The combustion zone may accelerate from a relatively slow speed to an extremely high speed almost instantaneously. This extreme imbalance in velocity may produce significantly higher energy levels and actinic radiation with shorter photon emissions. Photolysis is a term used to describe chemical decomposition by electromagnetic radiation. It can occur when combustion reactions accelerate to a range where the photon emissions released contribute to further chemical reactions rather than normal thermal decomposition reactions of regular, controlled combustion. The actinic radiation produced during non-uniform, intense combustion reactions tends to decompose not only the fuel's molecular clusters but also the otherwise inert nitrogen molecules, ultimately contributing to undesirable chemical reactions and the production of unwanted toxic $NO_{-x}$ emissions.

As alluded to already, combustion is a chemical process involving the transfer of electrons between atoms known as oxidation reduction. In this process, liquid fuels must be vaporized and dissociated into atoms or free radicals before they can combine with oxygen to form new substances. Under ideal conditions, a great deal of energy is released and carbon dioxide and water are formed. Combustion is a process that is not completely understood. It seems, however, that free radicals may be the key elements to promote and propagate controlled chemical reactions. Radicals are the reactive intermediates responsible for dissociating the large clusters making up the fuel's molecular compounds into individual atoms when they only then can be oxidized to produce heat. This is a chain branch disintegration process that progresses throughout the combustion chamber until the fuel is consumed. Under ideal conditions, the reaction rate and chemical reactivity of high-quality fuels is rapid and the combustion zone proceeds progressively but smoothly throughout the combustion chamber. The intensity of the reaction zone, which ultimately determines the intensity of electromagnetic energy released, has a significant effect on the vibrational energies imparted on the molecules in the combustion chamber, which significantly affects their heat release potential. The vibrational energies obtained by the gaseous molecules in the combustion chamber, under ideal combustion reactions, are transformed into organized molecular motion that in turn produces maximum momentum, or rather maximum potential mechanical energy. Organized molecular motion of a working fluid, namely, the nitrogen and products of combustion in the combustion chamber, enables the electromagnetic energy produced during combustion to be transformed into controlled pressure with minimum entropy. Entropy, or wasted heat energy, is largely a result of random, chaotic vibration energies released during uncontrolled, excessively rapid combustion reactions.

Ideally, therefore, for an engine to function at its maximum potential with minimum toxic emissions and greatest efficiency with lower maintenance, vibration, and operating temperatures (minimum entropy), the fuel must be able to decompose easily and to propagate combustion reactions with controlled, stable velocities with an absolute minimum of shock waves.

Figure 2:
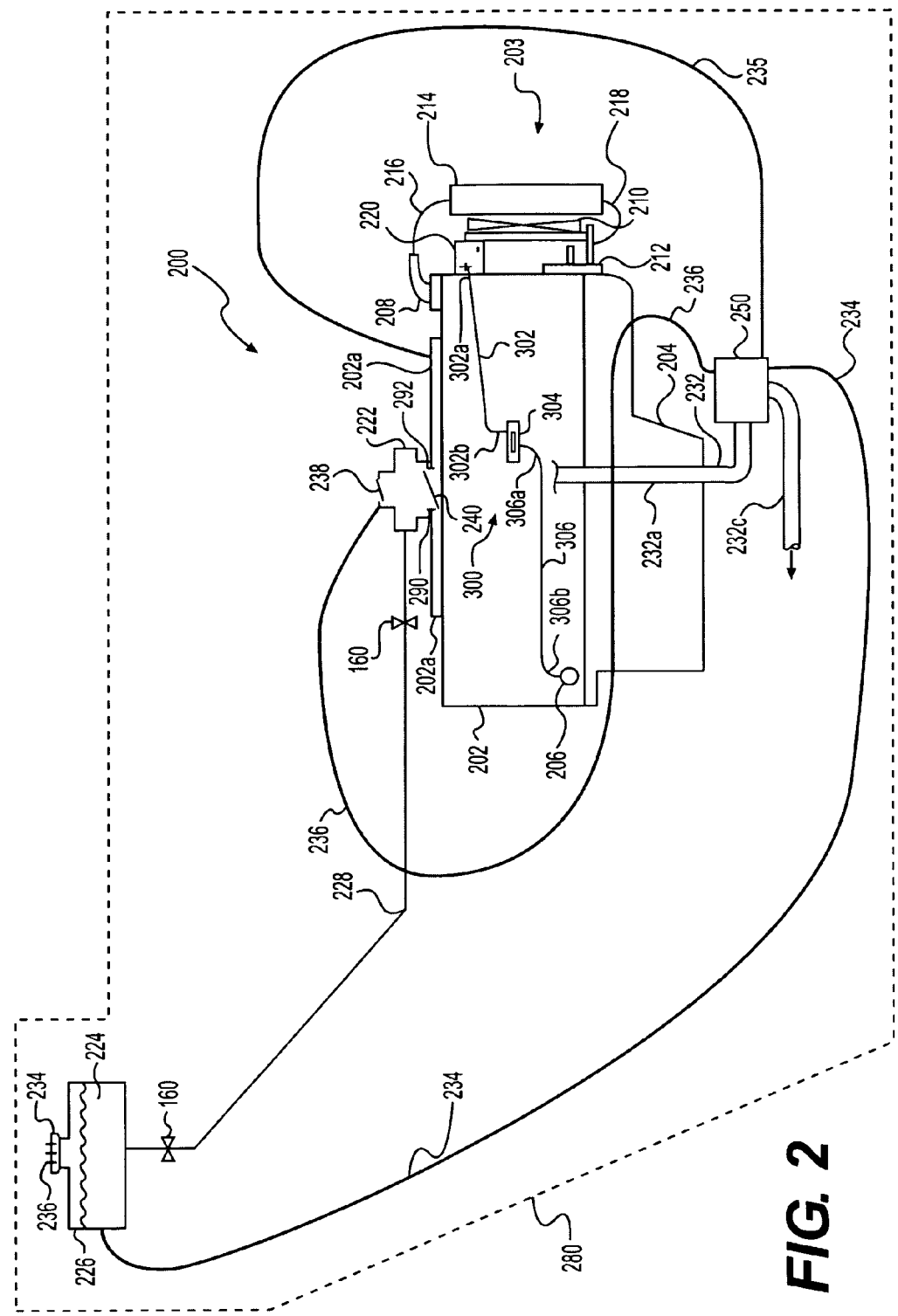
FIG. 2 is a schematic drawing of an automobile internal combustion engine having a carburetor in accordance with the present disclosure.

Turning now to FIG. 2, the principles of the present disclosure will be described in detail. In FIG. 2, there is depicted an internal combustion engine 200 in accordance with the present disclosure. Like engine 100, engine 200 may include an engine block 202, which may house a number of cylinders (not shown) and corresponding pistons (not shown), and an oil pan 204. Engine 200 may further include many of the components discussed relative to engine 100, including oil pressure sensor 206, thermostat 208, fan 210, water pump 212, radiator 214, and alternator 220. In some embodiments, it is contemplated that one or more of the aforementioned components may be excluded or duplicated as necessary.

In accordance with the present disclosure, engine 200 may be provided with a mechanism 300 for delivering energy to engine 200. The energy delivered to engine 200 may include, but is not limited to, mechanical energy, acoustic energy, electrical energy, radiant energy, thermal energy, chemical energy, or any combination thereof. Mechanism 300 may include any suitable mechanism known in the art. As a non-limiting example, in some embodiments, mechanism 300 may include a conductive element, including, but not limited to, a conductive wire or rod. For the purposes of this disclosure, it is contemplated that the conductive element of mechanism 300 may be conductive to one or more of the energies delivered to engine 200. As alluded to above, such energy may include, but is not limited to, mechanical energy, acoustic energy, electrical energy, radiant energy, thermal energy, chemical energy, or any combination thereof. Further, it is contemplated that mechanism 300, according to some embodiments, may be constructed of a suitable material, which does not diminish or retard in any way the quantity, quality, or intensity of energy being conducted through mechanism 300. In some other embodiments, mechanism 300 may be provided with an apparatus for amplifying the energy delivered through mechanism 300. In still other embodiments, mechanism 300 may include one or more components for regulating the flow of energy through mechanism 300, as will be discussed below in greater detail.

Mechanism 300 may be configured to deliver energy to engine 200, or any portion thereof, from any suitable source. As a non-limiting example, in some embodiments, energy may be delivered to engine 200 from an electrical source, including, but not limited to, a battery (not shown) or an electrical energy generator, such as, for example, without limitation, alternator 220. As alluded to above, alternator 220 may include, but is not limited to, a three-phase alternator. In other embodiments, energy may be delivered to engine 200 from any electrical field of suitable frequencies. Such electrical fields may be generated by, including, but not limited to, conventional generators, Muller dynamometers, magnetos, and/or static electricity. Further, those of ordinary skill in the art will readily recognize that energy may be delivered to a portion or all of engine 200 from a source disposed proximate to engine 200, spaced apart from engine 200, or from another part of engine 200.

In the illustrated non-limiting example, mechanism 300 may include a conductive wire 302 for delivering energy from alternator 220 to the oil circulating within engine block 202. Although those of ordinary skill in the art may recognize that alternator 220 may be supplying electrical energy to wire 302, the principles of the present disclosure account for wire 302 transmitting any of the aforementioned types of energy from alternator 220. As alluded to above, wire 302 may be conductive to one or more of mechanical energy, acoustic energy, electrical energy, radiant energy, thermal energy, chemical energy, or any combination thereof. Wire 302 may include any suitable conductive wire known in the art. As a non-limiting example, in some embodiments, wire 302 may include a conductive core surrounded by an insulating sheath. The conductive core may be metallic. In other embodiments, wire 302 may include, but is not limited to, a cable such as a fiber optic cable and/or coaxial cable.

Wire 302 may include any desired cross-sectional shape and/or configuration. As a non-limiting example, wire 302 may have a substantially circular cross-sectional shape. Wire 302 may also have one or more cross-sectional shapes and/or configurations along its length, and any desired dimensions suitable for transmitting energy to engine 200. As will be readily apparent to those of ordinary skill in the art, the overall dimensions of wire 302 may be dependent upon application, engine size, and the type and quantity of energy being transmitted through wire 302.

Wire 302 may include a first end 302a and a second end 302b. Although the depicted embodiment illustrates that first end 302a may be connected to alternator 220, those having ordinary skill in art will readily recognize that first end 302a may be connected to any suitable energy source. Further, it is contemplated that first end 302a may be connected to a positive output terminal or port of alternator 220. First end 302b, in some embodiments, may be connected to a component 304 for regulating or controlling the flow of energy from alternator 220 to engine block 202. In particular, it is contemplated that second end 302b may be connected to an input terminal of component 304. In other embodiments, however, second end 302b may be directly connected to the oil or other fluids within engine block 202 via a probe 308, which will be discussed below in greater detail. Regardless of how second end 302b may be connected to engine block 202, second end 302b may be electrically isolated from engine block 202. Second end 302b may be electrically isolated from engine block 202 by any suitable means. As a non-limiting example, second end 302b may be insulated from engine block 202 by disposing an insulating material between second end 302b and engine block 202. Such insulating materials may include, but are not limited to, rubber or any other suitable material.

Component 304 may include any suitable apparatus for regulating, modulating, and/or controlling the flow of energy from alternator 220 to engine block 220. Component 304 may regulate and/or control the flow of energy by any suitable means known in the art. Of course, the specific means chosen to regulate and/or control the flow of energy may depend on, among other things, the characteristics and type of the energy being transmitted. Further, the inclusion of component 304 within mechanism 300 may depend on, for example, without limitation, the type, quantity, and characteristics of energy being transmitted through mechanism 300, and the energy source for a particular application.

In some embodiments, component 304 may regulate the flow of energy through mechanism 300 by introducing a resistance, filtering, amplifying, or otherwise altering the energy flowing from alternator 220 so as to, for example, adjust or control the amount of energy flowing through component 304. The resistance introduced by component 304 may include a single fixed resistance and/or a variable resistance. In instances where the resistance introduced by component 304 is variable, a suitable mechanism for selectively controlling the magnitude of resistance introduced by component 304 may be provided.

In other embodiments, component 304 may serve to amplify the energy being transmitted through mechanism 300. Component 304 may serve to amplify the energy being transmitted through mechanism 300 by any suitable means known in the art. As a non-limiting example, component 304 may include an amplifier (not shown) that amplifies the energy input from alternator 220. Again, the specific amplifier required to amplify the energy flowing from alternator 220 may depend on, among other things, the characteristics of the energy transmitted and the particular application, such as, for example, engine type.

Component 304 may include, but is not limited to, any suitable electrical dimmer switch, which, for example, without limitation, may be configured to introduce a resistance to a flow of current. As a non-limiting example, the Model No. GLS03-B16681 dimmer switch commercially available from Lutron Electronics, Inc. may be used to adjust or control the amount of energy flowing from alternator 220 to engine 200.

As another non-limiting example, component 304 may comprise one or more electrical circuits or components electrically linked together. Such electrical components may include, but are not limited to, diodes, resistors, and/or transistors. These electrical components may be electrically connected to one another in any suitable manner. As a non-limiting example, such electrical components may be connected together either in parallel or in series. In particular, in some embodiments, component 304 may include a plurality of diodes connected together in series. In other embodiments, component 304 may include a central processing unit and any suitable software or computer-controlled program for controlling the aforementioned electrical components.

In embodiments where second end 302b of wire 302 is not directly connected to engine block 202, mechanism 300 may further include a second conductive wire 306. Wire 306 may be configured to transmit energy from component 304 to engine block 202. To avoid duplication, wire 306 may be substantially similar to wire 302, and may include many of the features and characteristics of wire 302 described above. As a non-limiting example, wire 306 may include a metallic core surrounded by an insulating sheath. Wire 306 may further include a first end 306a and a second end 306b. The first end 306a may be connected to an output terminal or port of component 304, and the second end 306b may be connected to the oil or other fluids (e.g., engine coolant, hydraulic fluids, and transmission fluids) within engine block 202.

Second end 306b of wire 306 may be connected to engine block 202 at any suitable, desired location. As a non-limiting example, second end 306b may be operably secured to a dipstick (not shown) received in engine block 202. In other embodiments, second end 306b may be connected to an exterior housing of engine block 202. In still other embodiments, second end 306b may be connected to a probe 308, as shown in FIG. 6, which depicts an exploded illustration of oil pressure sensor 206 and its connection to engine block 202.

Figure 6:
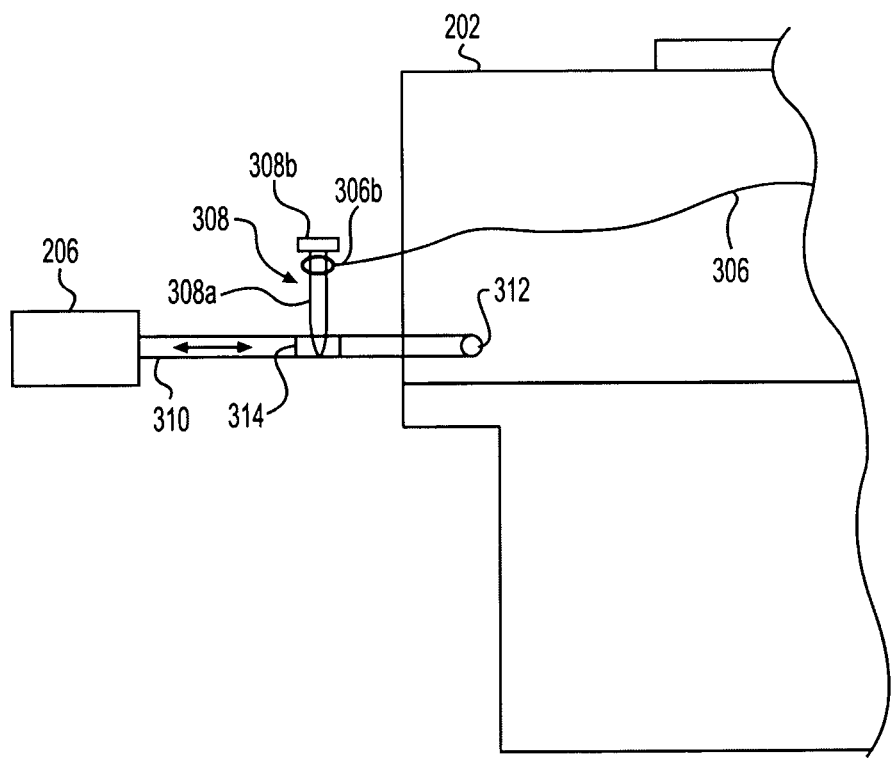
FIG. 6 is a schematic drawing of an exemplary oil probe apparatus and its connection to the engine depicted in FIG. 2, in accordance with the present disclosure.

Referring now to FIG. 6, probe 308 may include any suitable apparatus for transmitting energy from wire 306 to the oil or other fluids within engine block 202 with minimal losses or resistances. In some embodiments, probe 308 may include a generally elongate member configured to be suitably isolated from engine block 202. However, those of ordinary skill in the art will readily recognize that the physical characteristics and properties of probe 308 may be dependent upon, among other things, the type and quantity of energy being transmitted to the oil or other fluids within engine block 202.

In the illustrated non-limiting example, probe 308 may include a rigid metal rod. Probe 308 may be made from any suitable material configured to transmit energy at rapid rates. As a non-limiting example, probe 308 may be made of a metal, such as, for example, without limitation, iron, stainless steel, nickel, silver, gold, or any other suitable conductive material. In another non-limiting example, probe 308 may also be made of silicone or any other suitable composite material. Further, probe 308 may include any desired cross-sectional shape and/or configuration. As a non-limiting example, probe 308 may have a substantially circular cross-section. In addition, probe 308 may have one or more cross-sectional shapes and/or configurations along its length, and may have any desired dimensions. As a non-limiting example, probe 308 may include a portion 308b having an enlarged cross-sectional area.

Second end 306b of wire 306 may be secured to probe 308 in any suitable manner known in the art for transmitting energy from wire 306 to probe 308 with minimal losses. As a non-limiting example, the metallic core (not shown) of wire 306 may be soldered, welded, bonded, adhered, and/or mechanically fastened to probe 308.

Although the illustrated embodiment contemplates that wire 306 and probe 308 may be manufactured as separate components, those of ordinary skill in the art will readily recognize that wire 306 and probe 308 may be of a one-piece construction, so long as probe 308 may be electrically isolated from engine block 202. As a non-limiting example, probe 308 may be integrally formed with second end 306b of wire 306.

As alluded to above, FIG. 6 illustrates the connection between oil pressure sensor 206 and engine block 202. In particular, oil pressure sensor 206 may be fluidly connected to engine block 202 by a hose 310, which extends between a port 312 in engine block 202 and oil pressure sensor 206. Hose 310 allows oil to flow from within engine block 202 to oil pressure sensor 206 and back.

In some embodiments, probe 308 may be connected to engine block 202 via hose 310 and/or any other source so that probe 308 is in fluid communication with the oil or other fluids circulating within engine block 202. Probe 308 may be in either direct or indirect contact with the oil or other fluids circulating within engine block 202. As a non-limiting example, a portion of hose 310 may be cut to allow the introduction of probe 308 into the fluid (i.e., oil) pathway within hose 310. In one embodiment, hose 310 may be cut to permit the introduction of a fitting 314. Fitting 314 may include any suitable fitting, including, but not limited to, a T-shaped connector. As readily known to those of ordinary skill in the art, a T-shaped connector is an apparatus that includes three openings and may be used to connect a first fluid pathway to a second fluid pathway at a right angle to the first fluid pathway. Fitting 314 may be secured to hose 310 in any suitable manner known in the art. Once fitting 314 is secured to hose 310, probe 308 may be inserted into one of the openings of fitting 314 so that probe 308 is in contact with the oil flowing within hose 310. Although probe 308 may be connected to hose 310 by any suitable means, it is contemplated that the use of fitting 314 may facilitate selective insertion and removal of probe 308.

Those of ordinary skill in the art, however, will readily recognize that probe 308 may be placed in contact with the oil and/or other fluids within engine block 202 in any of a number ways, and that inserting probe 308 into a portion of hose 310 is but one non-limiting example of exposing the oil and/or other fluids within engine block 202 to probe 308. As another non-limiting example, an opening or port (not shown) may be created in engine block 202 and probe 308 may be inserted into engine block 202 through this opening so as to be placed in contact with the oil within engine block 202.

Without wishing to be bound to any particular theory, it is believed that the energy generated by alternator 220 is transmitted through mechanism 300 to the oil circulating within engine block 202. It is further believed that the energy transmitted to the oil conditions the oil, changing one or more characteristics or properties of the oil. These characteristics or properties may be physical and/or chemical, and may include, but are not limited to, viscosity, pour point, and flash point. While not being bound to any particular theory, it is believed that conditioning the oil within engine block 202 compresses the oil's molecules and creates an energy field about the oil, which leads to magnetizing engine 200. Once magnetized, engine 200 may be surrounded by a magnetic field 280, which may extend to fuel tank 226 and, in some embodiments, surround all metallic components associated with engine 200. It is also believed that conditioning the oil results in the oil circulating through engine 200 at an increased rate, which in turn facilitates increased removal of heat from engine 200.

It is known that an engine 200 becomes magnetized because a magnetic field has been detected at an engine constructed in accordance with the principles of the present disclosure. In particular, both a compass and a gauss meter were used to detect the presence of a magnetic field at an engine constructed in accordance with the principles of the present disclosure. The gauss meter detected a magnetic field of approximately −8 to 15 gauss at the engine constructed in accordance with the principles of the present disclosure. However, those of ordinary skill in the art will readily recognize that an engine 200 having a magnetic field of greater or lesser intensity than the field measured may enhance the benefits afforded by the principles of the present disclosure.

With renewed reference to FIG. 2, an engine 200 in accordance with the present disclosure further includes a fuel tank 226. Fuel tank 226 may be substantially similar to fuel tank 126. Unlike fuel tank 126, however, fuel tank 226 may be positioned in a plane disposed above a plane of carburetor 222, as shown, so that fuel 224 may flow to carburetor 222 under the influences of gravity, magnetic field 280, and/or the aforementioned vacuum typically maintained within engine 200, eliminating the need to pump fuel 224 to carburetor 222 by increasing the pressure of fuel 224. In other words, fuel 224 may be gravity fed to carburetor 222.

Carburetor 222 may include any suitable up-draft, side-draft, down-draft, or fuel injection body. As a non-limiting example, carburetor 222 may include, but is not limited to, the Performer Series® Carburetors manufactured by Edelbrock Corporation. Specifically, such Edelbrock carburetors may include any of the 1403-1407 and 1408-1413 Performer Series® Carburetors. As further non-limiting examples, carburetor 222 may include any suitable carburetor manufactured by Zenith Fuel Systems LLC or Stomberg.

Fuel 224 may travel to carburetor 222 via a fuel line 228. Fuel line 228 may be substantially similar to fuel line 128 discussed above. In some embodiments, however, fuel line 228 may include nickel, silver, known nickel alloys, known silver alloys, or any combination thereof. As a non-limiting example, an exterior and/or interior of fuel line 228 may be coated with nickel, silver, known nickel alloys, known silver alloys, or any combination thereof. As another non-limiting example, embodiments of fuel line 228 may be constructed with embedded particulates of nickel, silver, known nickel alloys, known silver alloys, or any combination thereof. As a further non-limiting example, embodiments of fuel line 228 may include one or more inserts (not shown) having nickel, silver, known nickel alloys, known silver alloys, or any combination thereof.

Figure 5:
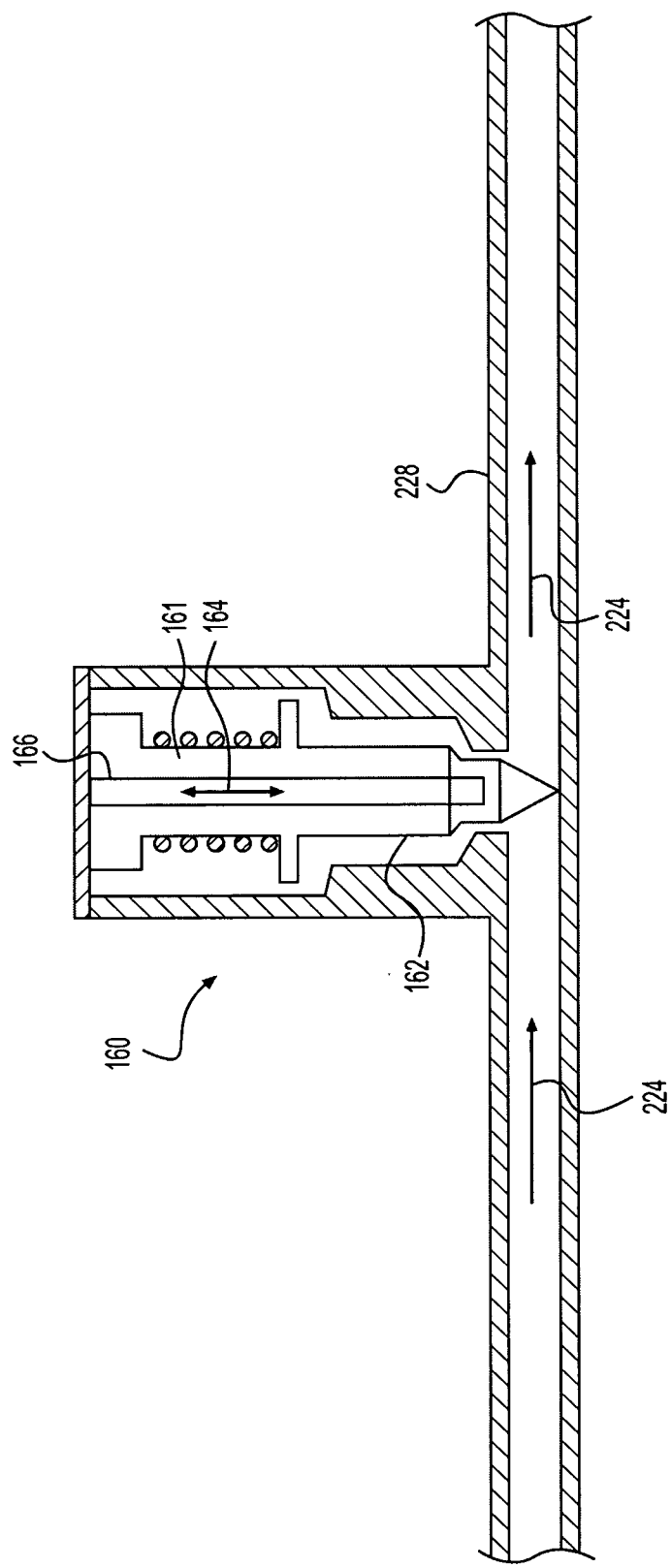
FIG. 5 is a schematic drawing of an exemplary needle valve apparatus in accordance with the present disclosure.

Referring to FIGS. 2 and 5, the flow of fuel 224 within fuel line 228 may be controlled or regulated by any suitable means known in the art, so that a constant flow, rather than a pulsed or otherwise irregular flow, of fuel 224 may be supplied to carburetor 222. As a non-limiting example, fuel line 228 may be provided with one or more valves 160. Valves 160 may include any suitable valves known in the art. In some embodiments, valves 160 may include needle valves. In the illustrated embodiment, it is contemplated that fuel line 228 may be provided with at least two needle valves 160, as shown in FIG. 2.

Since the use and operation of a needle valve is widely known to those of ordinary skill in the art, a detailed description of needle valves 160 is omitted in the interests of brevity. For the purposes of discussion, however, needle valves 160 may control the flow of fuel 224 within fuel line 228 by moving a lower portion 162 of needle 161 in the directions indicated by arrow 164. Specifically, when portion 162 is in the shown lowered position, portion 162 may impede the flow of fuel 224 past valve 160. When portion 162 is raised, however, the fuel flow pathway within fuel line 228 may be unimpeded.

Needle valves 160 may include any suitable needle valves known in the art, such as, for example, without limitation, commercially available stainless steel needle valves. In accordance with the principles of the present disclosure, however, each of needle valves 160 may include a core insert 166. Insert 166 may be fabricated by any known processes, such as, for example, without limitation, casting or extrusion. Further, insert 166 may have any desired cross-sectional shape and/or configuration. As a non-limiting example, insert 166 may have a substantially circular cross-section. In addition, insert 166 may also have one or more cross-sectional shapes and/or configurations along its length, and may have any desired dimension suitable for insertion into needle 161. As a non-limiting example, insert 166 may be configured to extend longitudinally within needle 161, such that insert 166 may be disposed within the portion of lower portion 162 closest to fuel 224 within fuel line 228. Insert 166 may have a material composition different from the material composition of valve 160. As a non-limiting example, in the illustrated embodiments, insert 166 may be fabricated from one of nickel, silver, known nickel alloys, known silver alloys, or any combination thereof. In addition, various configurations of wired grids of nickel, silver, known nickel alloys, known silver alloys, or any combination thereof may be secured to various surfaces of engine block 202, radiator 214, and/or any fluid reservoir or line. Such grids may be secured by any suitable means, including, but not limited to, soldering, welding, and/or mechanical fastening.

Without wishing to be bound to any particular theory, it is believed that allowing fuel 224 to be gravity fed to carburetor 222, without the pressure increases provided by a fuel pump, facilitates complete exposure of fuel 224 to magnetic field 280 of engine 200, so as to promote magnetization of fuel 224 before it is supplied to carburetor 222. It is further believed that magnetization of fuel 224 alters the combustion characteristics of fuel 224, so as to increase fuel economy as well as reduce the pollutants introduced into the atmosphere as a result of exhaust gas emissions. In general, it is believed that these advantageous results are obtained by changes in fuel 224, including, but not limited to, changes in viscosity, boiling points, magnetic susceptibility, electrical conductivity, volatility, atomization, flammability, rate of oxidation, and surface tension.

As used herein, the term "combustion characteristics" includes, but is not limited to, the expansion produced by the fuel in the combustion chambers of an engine; the revolutions per minute (RPM) of the engine produced by the combustion of a fuel; the parts per million (ppm) of carbon dioxide, hydrocarbons, and other combustion by-products in the exhaust of the engine; the miles per gallon achieved using the fuel; and the temperature of the exhaust stream from the engine. The combustion characteristics of a fuel indicate the efficiency and completeness with which a fuel burns and indicate the power produced or work achieved by the engine using the fuel. The combustion characteristics of a fuel are considered to be improved when, among other things, the fuel produces small quantities of carbon dioxide and other exhaustion products, when the miles per gallon achieved with the fuel increases, when the temperature of the engine exhaust decreases, and when the engine efficiency, torque, and RPM increase.

While not being bound to any particular theory, it is believed that fuel 224 may be polarized by exposure to magnetism. The effect of such exposure is believed to be the production of a moment created by the movement of the outer electrons of a hydrocarbon chain to states of higher principal quantum number. This movement, it is believed, breaks down the fixed valence electrons that partake in the bonding process of fuel compounds, thereby creating the condition for freer association of fuel particulates. In doing so, fuel 224 becomes directionalized or aligned, which does not necessarily create new hydrocarbon chains within fuel 224, but aligns the conducted magnetic moment into a dipole relationship within itself. This magnetic alignment then permits rapid bonding with respective oxidizing media, such as, for example, air. The result of which is, of course, an improvement in the combustion characteristics of fuel 224 and more complete and efficient burning of fuel 224.

Increased oxidation of fuel 224 is believed to cause several effects. In particular, faster and more complete oxidation of fuel 224 may result in more rapid and more complete combustion of fuel 224. More efficient combustion may create a more concentrated and more forceful driving force on the pistons (not shown) of engine 200, which results in the desirable effect of increasing the RPM of engine 200 for the same amount of fuel burned. The net effect is believed to be increased power and/or a corresponding decrease in fuel consumption for a given power output.

Another effect of increased oxidation is believed to be a reduction in the toxic compounds, such as, for example, $NO_{-x}$, produced during combustion of fuel 224. Although an increase in combustion temperature is generally associated with an increase in the formation of $NO_{-x}$, production of $NO_{-x}$ is believed to be reduced because of a reduction in combustion burn time. In addition, the increased heat produced during the combustion process is more rapidly dissipated by increased gas expansion and heat transfer through conductance to a greater available surface area.

As alluded to above, magnetization of fuel 224 is believed to condition fuel 224 so as to permit entry of energy into fuel 224. Further, it is believed to break down the bonds between the hydrocarbon chains of fuel 224. This results in decreased density and, thus, smaller particulars and droplets during atomization or injection within an internal combustion engine. Smaller particles and droplets cause changes in evaporation rate, improved mixing of fuel 224 and air, and improved promotion of oxidation. The net effect is believed to be an increase in the rate of combustion, an increase in power, and reduced pollutant formation.

Without wishing to be bound to any particular theory, it is believed that the combustion characteristics of fuel 224 are further improved by an electrochemical, quasi-catalytic reaction promoted by the presence of nickel, silver, known nickel alloys, or known silver alloys within needle valves 160. Specifically, it is believed that exposing fuel 224 to magnetic field 280 saturates fuel 224 with negative ions, effectively converting fuel 224 into a plasma fuel, as discussed below. Thus, since the net charges of the hydrocarbon molecules of fuel 224 and oxygen may be both negative, repulsive forces instead of attractive forces may exist between molecules of fuel and air. These repulsive forces tend to keep the hydrocarbon and oxygen molecules separated. It is therefore believed that the presence of nickel, silver, known nickel alloys, or known silver alloys within needle valves 160 serves to promote ionization of fuel 224 as it flows past needle valves 160. The ionization of fuel 224 is believed to (1) facilitate the cracking of the complex hydrocarbon molecules in fuel 224, and/or (2) create a hydrocarbon fuel with a net positive charge. It is further believed that the effect of ionizing the hydrocarbons within fuel 224 causes them to aggressively attract and bond with available oxygen, thereby increasing the combustibility of fuel 224.

In tested embodiments, it was observed that the fuel 224 being supplied to carburetor 222 was at a temperature of approximately −40° F. This temperature was measured in fuel line 228 at a location proximal to carburetor 222 by a digital thermometer. Further, it was observed that the fuel mixture within carburetor 222 was at a temperature of at least −100° F. This temperature was also measured with a digital thermometer.

The resultant fuel supplied to carburetor 222 appears to have characteristics of an ion saturated fuel, and thus will be referred to herein as "ionized fuel." As discussed below, it is further believed that the ionized fuel being supplied to carburetor 222 may combine with air to create a plasma because a bluish or whitish plume or glow, which is typically associated with plasma, such as, for example, cold plasma, has been observed in one of carburetor 222 and engine block 102, in embodiments that have been tested. However, since the chemical and/or other characteristics of the ionized fuel have not been completely characterized, the term "ionized fuel" as used herein is simply used as a title to refer to fuel conditioned as described herein.

In tested embodiments, it was observed that an engine constructed in accordance with the principles of the present disclosure maintains a vacuum of approximately 26-30 Hg, which is significantly higher than the aforementioned 18 Hg typically maintained by conventional internal combustion engines. In some embodiments, this increased vacuum may be maintained by any suitable means, including, for example, without limitation, adjusting the positioning of one or both of throttle plate 238 and lower plate 240. Without wishing to be bound by any particular theory, it is believed that the increased vacuum maintained by engine 200 may not only facilitate improved mixing of ionized fuel and air but also facilitate faster introduction of the air/plasma fuel mixture into engine block 202 from carburetor 222.

As those of ordinary skill in the art will recognize, engine 200 may include a plurality of fasteners 290, 292, such as, for example, without limitation, bolts or screws. These fasteners 290, 292 may serve to secure various components of engine 200 to one another. In the illustrated embodiment, fasteners 290, 292 may be used to secure carburetor 222 to engine block 202. To further promote ionization of fuel 224, it is contemplated that one or more of fasteners 290, 292 may include a core insert made of nickel, silver, known nickel alloys, or known silver alloys. As with needle valves 160, it is believed that increasing the exposure of fuel 224 to nickel or silver components may serve to further improve the combustion characteristics of fuel 224 through the electrochemical, quasi-catalytic reaction discussed above. Indeed, the principles of the present disclosure account for providing engine 200 with any suitable number of fasteners with inserts made of nickel, silver, known nickel alloys, or known silver alloys.

As alluded to above, delivering ionized fuel to carburetor 222 results in either a decrease in fuel combustion for a given output or a corresponding increase in power output for a given rate of fuel consumption. For certain internal combustion engine applications, such as, for example, applications in vehicles, an increase in power output may be undesirable. Instead, it may be preferred to maintain a given power output while reducing fuel consumption. In such cases, it may become necessary to selectively limit the flow of fuel 224 to carburetor 222, since excess fuel may flood carburetor 222 and cause engine 200 to stall. As alluded to above, the flow of fuel 224 from fuel tank 226 to carburetor 222 may be selectively controlled by needle valves 160. Of course, however, those of ordinary skill in the art will readily recognize that any suitable means of controlling the flow of fuel 224 within fuel line 228 may be utilized with the principles of the present disclosure.

As a consequence of reducing the flow of fuel 224 to carburetor 222, less air may be needed to combust the ionized fuel being supplied to carburetor 222. As those of ordinary skill in the art will recognize, providing carburetor 222 with more air than necessary may result in choking engine 200. Therefore, it may be necessary to limit the quantity of air being supplied to carburetor 222. The flow of air to carburetor 222 may be controlled by any suitable manner known in the art. As a non-limiting example, air flow into carburetor 222 may be controlled by adjusting throttle plate 238. In addition, or alternatively, the flow of air into engine 200 may be controlled by adjusting the dimensions of the air intake mechanism (not shown) of engine 200. As a non-limiting example, an opening into which atmospheric air flows may be reduced in diameter.

In some embodiments, the ionized fuel introduced into carburetor 222 may be so potent that it may not be necessary to mix the ion saturated fuel with air to create a suitable combustion mixture. Instead, the principles of the present disclosure contemplate combining air entering into carburetor 222 with ion saturated fuel vapors to create a plasma fuel/air mixture suitable for combustion. It is believed that conditioning the fuel as described above and exposing the ionized fuel to air facilitates a phase change of the ion saturated fuel vapors and the creation of plasma, such as, for example, cold plasma. The air entering carburetor 222 may be combined with ion saturated fuel vapors in any suitable manner. In the illustrated embodiment, it is contemplated that the ionized fuel level within the float chamber (not shown) of carburetor 222 may be reduced so that the fuel-side opening of the mixing tube (not shown) of carburetor 222 is not submerged in liquid ion saturated fuel. Reducing the liquid ionized fuel level within the float chamber of carburetor 222 may be accomplished by any suitable means known in the art. As a non-limiting example, one or more characteristics of the float of carburetor 222 may be modified to permit the float chamber to maintain a reduced level of liquid ionized fuel.

Without wishing to be bound by any particular theory, it is believed that reducing the ionized fuel level below the fuel-side opening of the mixing tube of carburetor 222 allows the air entering carburetor 222 to draw only ion saturated fuel vapors into the throat of carburetor 222 from its float chamber. The ion saturated fuel vapors drawn into the throat then combine with the air flowing in the throat to form a plasma fuel/air mixture according to the present disclosure.

As alluded to above, engine 200 may include a cooling system 203 made up of a thermostat 208 (which will be discussed in greater detail below), a fan 210, a water pump 212, and a radiator 214. Water pump 212 functions to circulate a cooling fluid (not shown) between engine block 202 and radiator 214. As noted above, the cooling fluid may include water, a mixture of water and ethylene glycol ($C_2H_6O_2$), which is also known as antifreeze, or any other suitable cooling fluid known in the art. Radiator 214 may function as a heat exchanger and transfer heat from the cooling fluid flowing from engine block 202 to the air blowing through radiator 214 by fan 210. Thermostat 208 may function to regulate the rate of cooling fluid flowing from engine 202 to radiator 214. The cooling fluid is circulated between engine block 202 and radiator 214 by an upper hose 216 and a lower hose 218.

Without wishing to be bound to any particular theory, it is believed that the exposure of the cooling fluid circulating within engine block 202 to magnetic field 280 and/or fasteners having inserts containing nickel or silver, such as, for example, fasteners 290, 292, conditions the cooling fluid circulating between engine block 202 and radiator 214. In particular, it is believed that exposing the cooling fluid to magnetic field 280 may induce many physicochemical changes in the cooling fluid. These changes include, but are not limited to, changes in viscosity, solubility, boiling point, magnetic susceptibility, electrical conductivity, and surface tension. It is further believed that the changes induced in the cooling fluid circulating between engine block 202 and radiator 214 may serve to condition cooling fluid in a manner so as to increase the overall efficiency of cooling system 203. Stated differently, it is believed that cooling fluid conditioned in this manner is capable of removing heat from within engine block 202 at a faster rate than cooling fluid that has not been conditioned by magnetic field 280 and/or exposure to nickel, silver, or alloys thereof.

In some embodiments, however, it may be desirable to cool engine block 202 at a rate faster than that possible with conditioned cooling fluid, given that commonly employed thermostats may not be capable of opening at the lower operating temperatures of an engine in accordance with the principles of the present disclosure. To accommodate faster cooling of engine block 202 in some embodiments, it may be desirable to replace the existing cooling fluid with a cooling fluid having greater heat capacity. In other embodiments, however, it may be desirable to increase the flow rate of the cooling fluid. The cooling fluid flow rate may be increased by modifying thermostat 208 in a manner that allows a greater volume of cooling fluid to flow through thermostat 208. As a non-limiting example, the area of thermostat 208 through which cooling fluid flows may be made larger, or one or more bypass pathways may be provided. In the embodiments tested, a plurality of additional cooling fluid flow pathways were created to, for example, without limitation, facilitate a greater flow rate of cooling fluid between engine block 202 and radiator 214. The plurality of fluid flow pathways may also facilitate cooling fluid flow through thermostat 208 even if thermostat 208 inhibits normal cooling fluid flow by remaining in the closed position. Stated differently, in some embodiments, the plurality of fluid flow pathways may allow the cooling fluid to bypass the closed thermostat 208. Such pathways may be created by any suitable measures known in the art, including drilling, and may be of any suitable dimension and configuration. In the tested embodiment, four holes were drilled around the normal cooling fluid flow pathway in a thermostat 208. Each of the drilled holes included a dimension of 0.125 inches. Of course, those of ordinary skill in the art will recognize that thermostat 208 may also be replaced with another thermostat that provides not only appropriate rate of coolant flow but also appropriate resistances of the cooling fluid flow.

Again, without wishing to be bound by any particular theory, it is believed that faster cooling of engine 200, along with the improved combustion characteristics of the plasma fuel being delivered to engine 200, allows engine 200 to operate more efficiently by consuming less fuel for a given power output and/or producing more power for a given consumption of fuel.

In some embodiments, the benefits realized as a result of the principles of the present disclosure may be enhanced by one or more modifications to the designs of conventional internal combustion engines. In particular, one or more components of a conventional internal combustion engine may be added, removed, and/or combined to create an engine in accordance with the present disclosure. As a non-limiting example, it is contemplated that the various fluid-containing devices in an engine (e.g., 200) may be combined to enhance the benefits realized as a result of the principles of the present disclosure. As a non-limiting example, a radiator, transmission cooler, engine oil cooler, and a power steering fluid reservoir may be combined to achieve enhanced benefits. Without wishing to be bound by any particular theory, it is believed that locating fluid-containing devices close to one another may serve to enhance the benefits described herein.

As discussed above, the principles of the present disclosure provide for altering the combustion characteristics, such as, for example, without limitation, flammability of fuel 224. As a result of supplying plasma fuel to carburetor 222, the intensity of the spark required to ignite the final plasma fuel/air mixture introduced into engine block 202 may be dependent on the combustion characteristics of the mixture. Therefore, it may be necessary to selectively control the intensity of the spark provided to ignite the plasma fuel/air mixture. The intensity of the spark provided may be controlled by any suitable manner known in the art. In some embodiments, the intensity of the spark provided may be controlled by limiting the electrical current supplied to the spark plugs (not shown) of engine 200. The electrical current supplied to the spark plugs may be limited by any suitable means known in the art. As a non-limiting example, it is contemplated that a resistance, including, but not limited to, the resistance provided by a commercially available rheostat, may be used to reduce the current provided to the spark plugs of engine 200.

In embodiments where engine 200 may include a gasoline spark-fired internal combustion engine utilizing an ignition mechanism to ignite the fuel, it is believed that the current provided to the ignition mechanism (not shown) of engine 200 may be reduced by up to approximately 1,000,000 percent, in order to produce a spark that will ignite the plasma fuel/air mixture completely. By way of a non-limiting example, it is known that some automobiles provide a current of approximately 3 to 5 amps to the ignition mechanism of the automobile's conventional internal combustion engine. Providing 3 to 5 amps to the ignition mechanism generates a spark large enough to ignite gasoline, for example. Should the engine be configured in accordance with the present disclosure, however, it is believed that the current supplied to the ignition mechanism may be reduced to approximately 0.003 mA to result in an ignition mechanism still able to produce a spark that will ignite the plasma fuel/air mixture completely. The aforementioned ignition mechanism may include any suitable ignition mechanism known in the art. As a non-limiting example, the ignition mechanism of some gasoline engine embodiments may include, among other things, a coil and a plurality of spark plugs. In other embodiments, the ignition mechanism may simply include, among other things, an elongate conductive wire, or any other suitable means of providing a spark to the plasma fuel/air mixture.

Without wishing to be bound by a particular theory, it is believed that the exhaust gases 251 leaving engine block 202 may include, for example, carbon monoxide, unburned fuel, unburned carbon, soot, and/or oil vapor. To, among other things, reduce the quantity of harmful pollutants released into the atmosphere, and potentially further increase the efficiency of engine 200, the present disclosure contemplates processing the exhaust gases 251 leaving engine block 202 before they are released into the atmosphere.

Figure 4C:
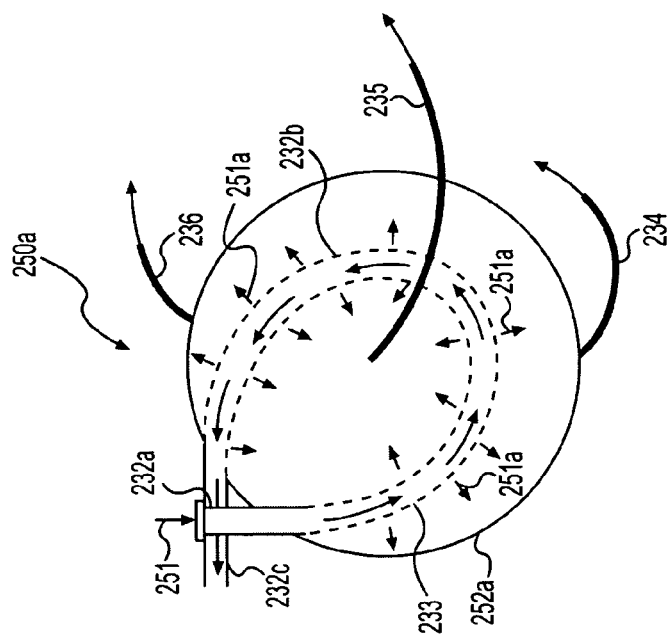
FIG. 4C is a schematic drawing of a side view of another exemplary exhaust particulate recovery apparatus in accordance with the present disclosure.
Figure 4B:
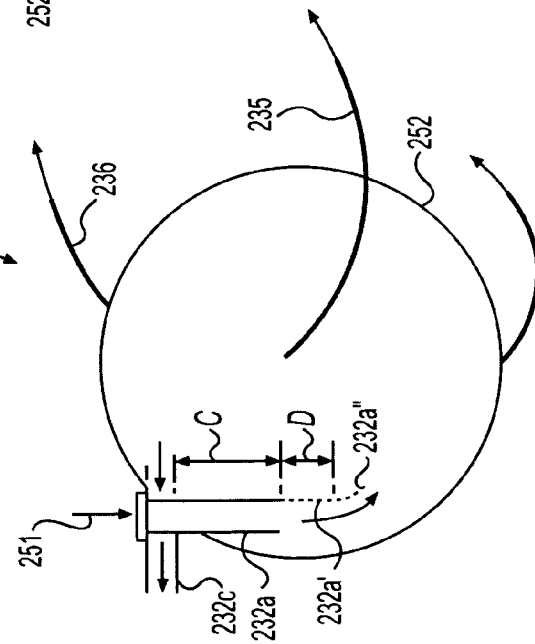
FIG. 4B is a schematic drawing of a side view of the exemplary exhaust particulate recovery apparatus of FIG. 4A.
Figure 4A:
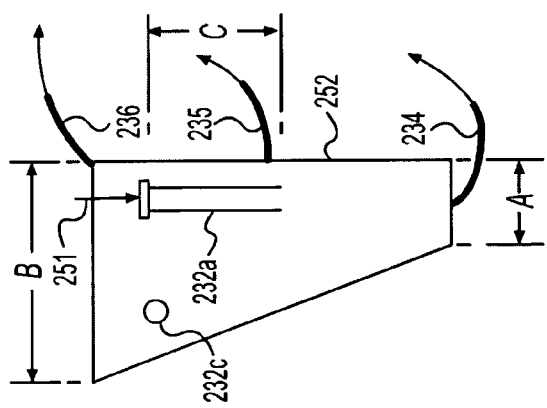
FIG. 4A is a schematic drawing of an end view of an exemplary exhaust particulate recovery apparatus in accordance with the present disclosure.

In accordance with the present disclosure, therefore, engine 200 may be provided with a mechanism 250/250a for processing the exhaust gases 251 leaving engine block 202, as shown in FIGS. 4A-4C. Mechanism 250/250a may include any suitable mechanism for removing fuel particulates, unburned hydrocarbon molecules, and other harmful compounds from the exhaust gases 251 leaving engine block 202. In the illustrated non-limiting examples, mechanism 250/250a may include an exhaust hose or pipe 232a extending from an exhaust manifold (not shown) of engine block 202. Pipe 232a may be used to transport exhaust gases 251 away from engine block 202 and into reclamation device 252.

Reclamation device 252 may include any suitable device for reclaiming and/or recycling particulates from exhaust gases 251. Reclamation device 252 may be made of any suitable material, such as, for example, stainless steel. Further, reclamation device 252 may be fabricated by any known process, such as, for example, extrusion and/or welding. Additionally, it is contemplated that reclamation device 252 may include any suitable, desired shape and/or dimensions. In one non-limiting example, reclamation device 252 may include a diameter of 16.5 inches. In addition, as shown in FIG. 4A, reclamation device 252 may include an upper depth dimension B of approximately 4.25 inches, and a lower depth dimension A of approximately 3 inches. With specific reference to FIG. 4B, in some embodiments, pipe 232a may include a length C of approximately 4.5 inches.

With renewed reference to FIGS. 4A-4B, exhaust gases 251 leaving engine block 202 may enter reclamation device 252 via pipe 232a. Exhaust gases 251 may be directed to the outer peripheries of reclamation device 252 by any suitable geometrical structures within reclamation device 252. In one non-limiting example, reclamation device 252 may include internal structures 232a' and 232a" for directing gases 251 towards an outer wall of reclamation device 252. Structure 232a' may include an elongated plate extending from an end of pipe 232a. In addition, structure 232a" may include a curved plate extending from structure 232a'. Structures 232a' and 232a" may include any shape and/or dimensions suitable for directing exhaust gases 251. For example, structure 232a" may include a curvature similar to that of an outer wall of reclamation device 252. Furthermore, structure 232a' may include a length dimension C of approximately 3 inches, and structure 232a" may include a length dimension D of approximately 1 inch. Still further, structures 232a' and 232a" may be made of any suitable material, such as, for example, stainless steel. Moreover, structures 232a' and 232a" may be fabricated by any suitable process known in the art, including, but not limited to, welding and/or extrusion. Reclamation device 252 may further include an exhaust outlet 232c for allowing exhaust gases 251 within reclamation device 252 to exit reclamation device 252.

Reclamation device 252 may further include a plurality of exhaust transmission lines 234, 235, and 236. Each of lines 234, 235, and 236 may include any hose or piping configuration suitable for transporting exhaust particulates leaving the exhaust gases 251 away from reclamation device 252. As a non-limiting example, lines 234, 235, and 236 may have substantially circular cross-sectional configurations. Further, lines 234, 235, and 236 may be made of any material suitable for transporting the exhaust particulates. In some embodiments, lines 234, 235, and 236 may share one or more physical or geometric characteristics with exhaust pipe 232a and/or exhaust outlet 232c. Further, although the illustrated embodiments depict each of lines 234, 235, and 236 as being substantially similar to one another, those of ordinary skill in the art will readily recognize that lines 234, 235, and 236 may differ from each other in, for example, without limitation, geometry and/or composition. Moreover, each of lines 234, 235, and 236 may include any suitable dimensions. As a non-limiting example, in some embodiments, lines 234, 235, and 236 may include a diameter of 0.0625 inches. Lines 234, 235, and 236 may be connected to reclamation device 252 by any suitable manner known in the art. As a non-limiting example, lines 234, 235, and 236 may be connected to reclamation device 252 through openings or ports (not shown) provided in reclamation device 252. Regardless of the means of connection to reclamation device 252, it is contemplated that the connection between each of lines 234, 235, and 236 and reclamation device 252 may be substantially airtight so as to avoid any undesired leakage of exhaust gases 251 and/or particulates removed from the exhaust gases 251.

Lines 234, 235, and 236 may be used to recycle particulates (e.g., unburned hydrocarbon molecules) removed from exhaust gases 251 by reclamation device 252. In particular, it is contemplated that the particulates removed from exhaust gases 251 may be returned to engine 200 to further improve the overall fuel efficiency of engine 200. The particulates removed through lines 234, 235, and 236 may be returned to any suitable portion of engine 200.

With renewed reference to FIG. 2, it is contemplated that the particulates removed by line 234 may be returned to, for example, without limitation, fuel tank 226; the particulates removed by line 235 may be returned to engine 200 through, for example, without limitation, intake manifold 202a; and the particulates removed by line 236 may be returned to engine 200 through, for example, without limitation, an air intake of carburetor 222.

The exit pressure of exhaust gases 251 may be sufficient, in some embodiments, to push the removed particulates through lines 234, 235, and 236 and back to engine 200. In other embodiments, however, a motive force, such as, for example, without limitation, a vacuum, may be needed to assist in the transportation of particulates through lines 234, 235, and 236. A vacuum may be generated in lines 234, 235, and 236 by any suitable, conventional means. As a non-limiting example, a vacuum pump (not shown) may be utilized to facilitate the transmission of particulates through lines 234, 235, and 236. Alternatively, the aforementioned increased vacuum pressure generated within engine 200 may be harnessed to facilitate the transmission of particulates through lines 234, 235, and 236.

In the embodiments tested, the temperature of the exhaust gases 251 leaving engine 200 and entering reclamation device 252 was measured to be between approximately 285° F. to 350° F. Further, it was observed that the exhaust gases 251 cooled as they traveled through reclamation device 252 to exhaust outlet 232c. In some embodiments, the temperature of exhaust gases 251 as they approached line 235 were measured to be between approximately 165° F. to 212° F. Further, as the exhaust gases 251 approached line 236, the temperature of the exhaust gases 251 was measured to be between approximately 118° F. to 122° F. Finally, the temperature of the exhaust gases 251 leaving exhaust outlet 232c was measured to be approximately 95° F. The temperatures noted in this paragraph were measured with a digital thermometer on embodiments constructed in accordance with the principles of the present disclosure.

While not being bound by any particular theory, it is believed that reclamation device 252 functions as a distilling or refining apparatus for exhaust gases 251. In particular, the construction of reclamation device 252, and the strategic placement of lines 234, 235, and 236, may help to remove hydrocarbon molecules of differing molecular weights from exhaust gases 251. Specifically, it is believed that as exhaust gases 251 at ~310° F. enter reclamation device 252, the heavier hydrocarbon molecules within exhaust gases 251 are still in a gaseous state and therefore light enough to be extracted into line 234. As the exhaust gases 251 travel to the location of line 235, it is believed that the temperature of exhaust gases 251 may cool to ~200° F. At this temperature, it is believed that the heavier hydrocarbon molecules may no longer be light enough to be extracted from exhaust gases 251, but that the next lighter group of hydrocarbon clusters may still be in a completely gaseous state and therefore light enough to be extracted into line 235. Similarly, as the exhaust gases 251 travel to the location of line 236, it is believed that the temperature of exhaust gases 251 is reduced to ~118° F. At this temperature, the middle (and heaviest) group of hydrocarbon molecules may no longer be light enough to be extracted from exhaust gases 251, but that the next lighter group of hydrocarbon clusters may still be in a completely gaseous state and therefore light enough to be extracted into line 236.

It is believed that processing exhaust gases 251 in this manner facilitates the removal of, among other things, unused hydrocarbon molecules, unburned fuel, and other harmful pollutants from exhaust gases 251. The unused hydrocarbon molecules and fuel may be returned to engine 200 as discussed above. Further, it is believed that processing exhaust gases 251 in the manner discussed above may serve to reduce the quantities of toxic compounds ultimately leaving engine 200. In some embodiments, reclamation device 252 may completely cleanse exhaust gases 251 so that only ionized air at approximately 95° F. may be ultimately discharged as exhaust from engine 200 via exhaust outlet 232c.

Referring to FIG. 4C, another embodiment of an exhaust reclamation device is depicted as reclamation device 252a. Reclamation device 252a may be substantially similar to reclamation device 252 of FIGS. 4A-4B. Reclamation device 252a, however, may include one or more internal geometrical structures for assisting in the removal of particulates from exhaust gases 251. In the depicted embodiment, reclamation device 252 may include a conduit or pipe 232b connecting an outlet of pipe 232a to an inlet of exhaust outlet 232c. Pipe 232b may also serve to direct exhaust gases 251 from pipe 232a to exhaust outlet 232c and past lines 234-236, as shown in FIG. 4C. As also shown in FIG. 4C, pipe 232b may include a plurality of openings 233. Openings 233 may be of any suitable configuration. As a non-limiting example, openings 233 may be substantially circular. Further, openings 233 may have any suitable dimension for facilitating the removal of particulates from exhaust gases 251. The particulates leaving exhaust gases 251 may enter one or more of lines 234, 235, and 236, as discussed above in connection with FIGS. 4A-4B.

Figure 3:
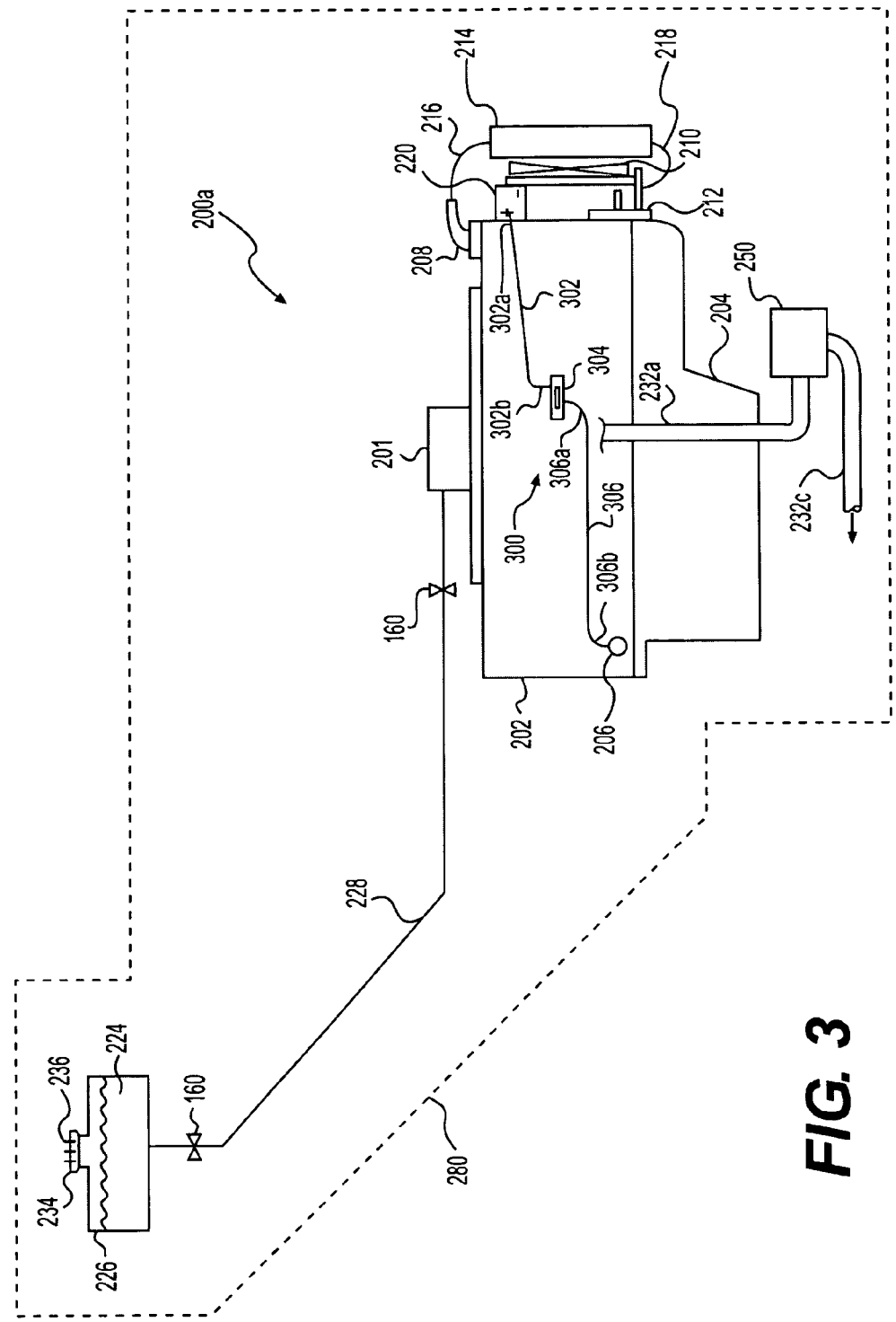
FIG. 3 is a schematic drawing of an automobile internal combustion engine having a fuel injection system in accordance with the present disclosure.

Although the principles of the present disclosure have been discussed relative to engine 200 having a carburetor 222, those of ordinary skill will readily recognize that the benefits of the principles described herein may be also realized by engines that do not include carburetors. Such engines may include, but are not limited to, engines utilizing alternative fuel delivery mechanisms. As a non-limiting example, as shown in FIG. 3, engine 200a may be substantially similar to engine 200, but may include a fuel injection system 201 instead of a carburetor.

As alluded to above, the principles of the present disclosure contemplate selectively controlling a number of differing parameters within engine 200. These parameters may include, but are not limited to, the flow of fuel from fuel tank 226 to carburetor 222, the flow of energy from alternator 220 to the oil within engine block 202, the flow of air entering engine 200, the flow of exhaust gases 251 through mechanism 250, and the flow of cooling fluid between radiator 214 and engine block 202. While these various parameters may be controlled in any number of different manners, those of ordinary skill will readily recognize that engine 200 may be provided with a plurality of suitable sensors (not shown) and a central processing unit (CPU) (not shown) so as to automate the control of these exemplary parameters. Further, one or more of the aforementioned parameters may be selectively programmable by an external console, which may be maintained at, for example, a gas station, mechanic, and/or an automobile dealership. The external console may include any suitable CPU or microprocessor known in the art. In embodiments where an internal combustion engine according to the principles of the present disclosure is utilized in non-vehicular applications, the external console may be portable for transport to the engine's location. In addition to programming the control of engine 200, an external console according to the principles of the present disclosure may be utilized for, among other things, diagnostics and/or tuning of an engine 200. Those of ordinary skill will also recognize that engine 200 may include a plurality of sensors (not shown) to facilitate in the diagnosis of engine 200.

Those of ordinary skill in the art will also recognize that the principles of the present disclosure and the embodiments described herein may be incorporated into any suitable internal combustion engine. As a non-limiting example, it is contemplated that the principles of the present disclosure may be used to modify or retrofit existing engines to improve the overall performance and efficiency of such engines. The principles of the present disclosure may also be incorporated into new engines to produce engines of increased efficiency and performance.

EXAMPLES

In order to verify the principles of the present disclosure, the embodiments described herein were implemented as follows:

Example 1

A 1988, 305 cubic inch, V8 engine installed in a 1979 GMC pickup truck was retrofitted in accordance with the principles of the present disclosure. The engine was supplied with gasoline having an octane rating of 87, and included a Quadrajet carburetor having an electric choke. Prior to modifying the engine with the principles of the present disclosure, an average gas mileage of 16-18 mpg was observed.

In accordance with some of the aforementioned embodiments, the engine of this truck was modified in the following manner. First, energies were delivered from the alternator of the truck's engine to the oil circulating within the truck's engine block. A Lutron switch was utilized to control the flow of energies to the engine's oil, as discussed above. The energies were delivered to the engine's oil via a stainless steel probe connected to a wire made of 12 gauge copper. Second, a rheostat was installed to limit the current supplied to the coil of the engine's ignition system. Third, the main gas lines were rerouted so that there was a first supply line to the carburetor and a second supply line from the fill neck of the gasoline tank to the carburetor. The flow within these supply lines was controlled by needle valves. Fourth, the flow of air into the carburetor was regulated by adjusting the position of the choke plate. Fifth, the fuel level in the carburetor was lowered to approximately ⅛ inch, so that the fuel-side opening of the mixing tube was not submerged in liquid fuel, as also discussed above.

During testing of the engine with the first through third modifications noted above, it was observed that, among other things, fuel consumption decreased by approximately 25% when the engine was operating at approximately 1800 to 2100 rpm, and the truck was driving at speeds of approximately 60-70 mph. In particular, it was observed that the truck was achieving an average gas mileage of approximately 22-24 mpg when traveling distances of approximately 100 miles. These data were verified by four additional 100 mile tests and the results of each test were within 2% of each other.

During testing of the engine with each of the modifications noted above, it was observed that fuel consumption was greatly reduced. In particular, it was observed that the truck was achieving an average gas mileage of approximately 60 mpg when the engine was operating at approximately 1800-2600 rpm and at speeds of approximately 60-80 mph. These data were verified by four additional 100 mile tests, and the results of each test were within 3% of each other.

Further, a measurement of the magnetic fields in and around the engine revealed that the fuel tank possessed a magnetic field of approximately +2.0 to +3.0 gauss at the top of the fuel tank and −5.0 gauss at the bottom of the tank. In addition, the engine was examined after 500 hours of use and no signs of wear were observed.

Example 2

A 2004 Dodge Ram 2500 Quadcab diesel truck having a weight of 9826 lbs was retrofitted in accordance with embodiments of the present disclosure. The truck included a four wheel drive configuration and a six (6) cylinder, 5.7 liter engine. Prior to modifying the engine with the principles of the present disclosure, an average gas mileage of 13 mpg was observed for this truck. Further, black smoke was observed from the exhaust upon acceleration. In addition, during normal operation, an average approximate radiator temperature of 195° F. was observed.

In accordance with some of the aforementioned embodiments, energies were delivered from the alternator of the truck's engine to the oil circulating within the truck's engine block. In particular, one end of a 10 gauge, 19 strand, THNN copper wire was connected to the positive pole of the alternator. The other end of this wire was connected to a Lutron switch, as described above. A second 10 gauge, 19 strand, THNN copper wire connected the Lutron switch to the engine's oil sending unit. The second wire was secured to the oil sending unit with a conventional alligator clip.

Once the truck's engine was modified in the manner described above, it was observed that the radiator operated at much cooler temperatures. In particular, an average radiator operating temperature of approximately 100° F.-110° F. was observed. Further, driving tests of the truck revealed an observable diesel mileage of approximately 30-32 mpg. In addition, the exhaust of the truck no longer emitted the black smoke previously observed upon acceleration, indicating a significant reduction in exhaust particulates. Moreover, it was observed that engine sound had diminished considerably. In particular, it was noted that the diesel engine was emitting sounds comparable to those of a conventional gasoline engine.

Further, from a stopped position, the truck was able to travel 0.25 miles in 14.5 seconds. According to routine calculations based on the truck's weight and the time the truck took to travel 0.25 miles, it is estimated that the truck's engine was producing approximately 825-875 hp and 1100-1200 ft/lbs of torque. During this test, improved acceleration response was also observed.

Example 3

A 1965 Ford Mustang having a 4.7 L, 289 cubic inch, V8 engine was also retrofitted in accordance with the present disclosure. The engine included an Edelbrock Performance carburetor having a manual choke. Prior to modifying the engine with the principles of the present disclosure, an average gas mileage of 14 mpg was observed for this car.

In accordance with some of the aforementioned embodiments, the engine of this car was modified in the following manner. First, a fuel line from the fill neck of the car's gasoline tank was connected to the driver's side of the carburetor. Flow through this fill line was controlled by a 1/8 inch needle valve. Second, energies were delivered from the alternator of the truck's engine to the oil circulating within the truck's engine block. A Lutron switch was utilized to control the flow of energies to the engine's oil. The energies were delivered to the engine's oil via a probe connected to a wire made of 316 stainless steel. This wire was insulated by electrical tape wrapped about the wire. In this modification, the oil probe was installed in the external oil cooler. Third, the engine's thermostat was provided with two additional 1/8 inch coolant passageways, as discussed above. Fourth, the pressure of the fuel being supplied to the engine's carburetor was reduced to approximately 0.5 PSI.

During road testing, improved fuel mileage of approximately 22 mpg was observed during drives of approximately 100 miles. Further, improved torque and acceleration by the truck's engine were noted by operators. Moreover, a reduction in exhaust noise was also observed. In addition, a magnetic field was detected in oil samples removed from the car's engine. In particular, a military grade compass was disposed approximately 8 inches away from the oil samples, and the north designated needle of the compass pointed to the oil container, regardless of the location of the compass.

Example 4

A 1995 Ford F150, 4-wheel-drive, pickup truck having over 150,000 driven miles was also modified in accordance with the principles of the present disclosure. This truck included a 351 cubic inch engine with electronic fuel injection. Prior to modification of the truck's engine, this truck was achieving approximately 8-10 mpg.

In accordance with the embodiments described herein, this truck's engine was modified in the following manner. First, a vapor recovery line was installed from the gas tank to the passenger side of an Edelbrock Performance carburetor having a manual choke. Flow through this line was controlled with a 1/8 inch needle valve. Second, a rheostat was installed to limit the current provided to the coil of the ignition system. Third, the choke and throttle plates of the carburetor were adjusted to control the flow of air into the carburetor. Fourth, energies were delivered from the alternator of the truck's engine to the oil circulating within the truck's engine block. Fifth, the engine's thermostat was provided with two additional 1/8 inch coolant passageways.

During testing, the truck was fueled with gasoline having an octane rating of 87 and improved gas mileage was observed. In particular, it was observed that the truck was achieving approximately 20-22 mpg during a particular test drive of approximately 1000 miles. During a second test drive of approximately 1000 miles, the truck was loaded with approximately 8600 lbs of payload. During this test, an improved gas mileage of approximately 16 mpg was observed. In both tests, the truck was driven at approximately 70-75 mph. During these tests, improved power production by the truck's engine was noted by operators.

Example 5

A 1973 Case 580CK excavator having a rating of 55 hp was also retrofitted in accordance with the principles of the present disclosure. The excavator included a gravity-fed fuel system and a Zenith carburetor having a manual choke. The excavator was running on gasoline having a fuel rating of 87 octane. Prior to modification, it was noted that between 1.25 to 1.75 US gallons of fuel were being consumed when operating the excavator at 1/2 to full capacity per hour. In general, the excavator's capacity is approximately one (1) cubic yard of material in the front bucket.

In accordance with the embodiments described herein, this excavator was modified in the following manner. First, energies were delivered from the alternator of the truck's engine to the oil circulating within the truck's engine block. In particular, a 12 gauge copper THNN wire was used to transfer energies from the engine's alternator to the oil circulating within the engine. The flow of energy through the copper wire was regulated by a Lutron switch, as discussed above. Further, the energies were delivered to the engine's oil via a 316 stainless steel probe between the engine's oil sending unit and engine block. Next, a total of six (6) periodic adjustments were made to the engine's fuel and air supplies, with each adjustment further reducing the supplies of air and fuel. The observations made during each of the six (6) periodic adjustments are discussed below in greater detail. For each adjustment, however, it was noted that the temperature of the exhaust at the manifold was approximately 350° F. to 450° F. Within 28 inches of the exhaust manifold, the temperature of the exhaust had cooled to approximately 80° F.

During operation, and after the first adjustment, it was observed that the excavator consumed 1.25 gallons of fuel to move a given load for one (1) hr. After the second adjustment, the excavator consumed 1.10 gallons to move a similar load for the same amount of time. After the third adjustment, the excavator consumed 1.0 gallon to move a similar load for the same amount of time. After the fourth adjustment, the excavator consumed 0.74 gallons to move a similar load for the same amount of time. After the fifth adjustment, the excavator consumed 0.5 gallons to move a similar load for the same amount of time. After the sixth adjustment, the excavator consumed 0.35 gallons to move a similar load for the same amount of time.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of operating an internal combustion engine, comprising:
   delivering an energy from an alternator through a conductive wire directly to one of an oil or a coolant circulating within the internal combustion engine said conductive wire contacting the oil or coolant via a dipstick or probe,
   magnetizing a portion of the internal combustion engine;
   delivering fuel to the internal combustion engine;
   regulating the flow of the fuel to the internal combustion engine;
   combining the fuel with air to create a combustion mixture, wherein the combustion mixture includes a plasma; and
   combusting the combustion mixture.

2. The method of claim 1, wherein the fuel includes ionized fuel.

3. The method of claim 1, further comprising the step of ionizing the fuel.

4. The method of claim 1, wherein the plasma is a cold plasma.

5. The method of claim 1, wherein the internal combustion engine includes a plurality of metallic components, and wherein magnetizing a portion of the internal combustion engine includes surrounding the plurality of metallic components with a magnetic field.

6. The method of claim 1, further comprising the step of filtering an exhaust of the internal combustion engine to remove hydrocarbon particulates from the engine.

7. The method of claim 6, further comprising the step of recycling the removed hydrocarbon particulates, wherein recycling the removed hydrocarbon particulates includes returning the removed hydrocarbon particulates to the internal combustion engine.

8. The method of claim 1, wherein regulating the flow of the fuel includes regulating the flow with a valve having a portion made of one of nickel and silver.

9. The method of claim 1, further comprising regulating the delivery of the energy to the fluid with an energy delivery device.

10. The method of claim 1, wherein delivering fuel to the internal combustion engine includes delivering the fuel to the internal combustion engine via a carburetor.

11. The method of claim 1, wherein delivering fuel to the internal combustion engine includes delivering the fuel from a fuel tank disposed above the internal combustion engine so that the fuel is gravity-fed into the internal combustion engine.

12. The method of claim 10, further comprising regulating a flow of air through the carburetor.

13. A method of operating an internal combustion engine, comprising:
   delivering an energy solely from an alternator through a condutive wire directly to one of an oil or a coolant circulating within the internal combustion engine said conductive wire contacting the oil or coolant via a dipstick or probe,
   magnetizing a portion of the internal combustion engine;
   delivering fuel to the internal combustion engine;
   regulating the flow of the fuel to the internal combustion engine;
   combining the fuel with air to create a combustion mixture, wherein the combustion mixture includes a plasma; and
   combusting the combustion mixture.

* * * * *